US009009089B1

(12) United States Patent
El Defrawy et al.

(10) Patent No.: US 9,009,089 B1
(45) Date of Patent: Apr. 14, 2015

(54) SECURE PATTERN MATCHING

(71) Applicant: HRL Laboratories, LLC, Malibu, CA (US)

(72) Inventors: Karim El Defrawy, Santa Monica, CA (US); Kirill Minkovich, Encino, CA (US); Joshua W. Baron, Los Angeles, CA (US); Eric P. Tressler, Calabasas, CA (US); Heiko Hoffmann, Simi Valley, CA (US)

(73) Assignee: HRL Laboratories, LLC, Malibu, CA (US)

( * ) Notice: Subject to any disclaimer, the term of this patent is extended or adjusted under 35 U.S.C. 154(b) by 220 days.

(21) Appl. No.: 13/749,683

(22) Filed: Jan. 25, 2013

Related U.S. Application Data

(63) Continuation-in-part of application No. 13/358,095, filed on Jan. 25, 2012, now Pat. No. 8,818,923.

(60) Provisional application No. 61/501,636, filed on Jun. 27, 2011, provisional application No. 61/591,207, filed on Jan. 26, 2012.

(51) Int. Cl.
  *G06F 15/18* (2006.01)
  *G06F 21/60* (2013.01)

(52) U.S. Cl.
  CPC .................................. *G06F 21/602* (2013.01)

(58) Field of Classification Search
  CPC ..... G06F 15/18; G06F 17/30247; G06N 3/02; G06N 3/08; G06K 9/62; G06K 9/6247
  See application file for complete search history.

(56) References Cited

U.S. PATENT DOCUMENTS

| 7,085,418 | B2 | 8/2006 | Kaneko et al. | |
|---|---|---|---|---|
| 7,599,894 | B2 | 10/2009 | Owechko et al. | |
| 7,787,474 | B2 | 8/2010 | Van Lunteren | |
| 8,068,431 | B2 | 11/2011 | Varadarajan et al. | |
| 2010/0076919 | A1* | 3/2010 | Chen et al. | 706/48 |
| 2014/0121990 | A1* | 5/2014 | Baldi et al. | 702/20 |

OTHER PUBLICATIONS

Alfred V. Aho and Margaret J. Corasick. Efficient string matching: an aid to bibliographic search. Commun ACM, 18:333-340, Jun. 1975.

(Continued)

*Primary Examiner* — Jeffrey A Gaffin
*Assistant Examiner* — Dave Misir
(74) *Attorney, Agent, or Firm* — Tope-McKay & Associates

(57) ABSTRACT

Described is a system for allowing sets of processors to engage in a secure pattern matching protocol. An input pattern is received from a first set of processors, while a text is received from a second set of processors. A matrix is constructed based on values computed for each character determined by each character's position in the pattern. The first set of processors sends an encrypted matrix to the second set of processors. The second set of processors processes each character in the text and creates a set of vectors. A final activation vector is created based on processing the set of vectors and an encrypted activation vector. The second set of processors sends the final activation vector to the first set of processors. The second set of processors decrypts the final activation vector. The system provides to the first set of processors where the pattern matches the text.

17 Claims, 14 Drawing Sheets

(56) References Cited

OTHER PUBLICATIONS

Marina Blanton and Mehrdad Aliasgari. Secure outsourcing of dna searching via finite automata. In 24th annual IFIP WG 11.3 working conference on Data and applications security and privacy (DBSec'10), pp. 49-64, 2010.

Taher El Gamal, A public key cryptosystem and a signature scheme based on discrete logarithms. In Proceedings of CRYPTO 84 on Advnaces in cryptology, pp. 10-18, New York, NY, USA, 1985. Springer-Verlag New York, Inc.

Ronald Cramer, Rosario Gennaro, and Berry Schoenmakers. A secure and optimally efficient multi-authority election scheme, pp. 103-118, Springer-Verlag, 1997.

Ivan Damgård, Efficient concurrent zero-knowledge in the auxiliary string model, In Proceedings of the 19th international conference on Theory and application of cryptographic techniques. EUROCRYPT'00, pp. 418-430, Berlin, Heidelberg. 2000. Springer-Verlag.

Ivan Damgård and Mats Junik. A generalisation, a simplification and some applications of paillier's probabilistic public-key system. In Proceedings of the 4th International Workshop on Practice and Theory in Public Key Cryptograpy: Public Key Cryptography, PKC '01, pp. 119-136, London, UK, 2001. Springer-Verlag.

Ivan Damgård and Claudio Orlandi. Multiparty computation for dishonest majority: from passive to active security at low cost. In proceedings of the 30th annual conference on Advances in cryptology, CRYPTO'10, pp. 558-576, Berlin, Heidelberg, 2010. Springer-Verlag.

Jens Groth and Yuval Ishai. Sub-linear zero-knowledge argument for correctness of a shuffle. In Nigel Smart, editor, Advncaes in Cryptology—EUROCRYPT 2008, vol. 4965 of Lecture Notes in Computer Science, pp. 379-396. Springer Berlin / Heidelberg, 2008.

O. Goldreich, S. Micali, and A. Wigderson. How to play any mental game. In Proceedings of the nineteenth annual ACM symposium on Theory of computing, STOC '87, pp. 218-229, New York, NY, USA, 1987 ACM.

Juan A. Garay, Philip MacKenzie, and Ke Yang Strengthening zero-knowledge protocols using signatures. In Proceedings of the 22nd international conference on Theory and applications of cryptographic techniques, EUROCRYPT'03, pp. 117-194, Berlin, Heidelberg. 2003. Springer-Verlag.

Carmit Hazay, Rosario Gennaro, and Jeffrey Sorensen, Automats evaluation and text search protocols with simulation based security. In Public Key Cryptography, pp. 145-160, 2010.

Heiko Hoffmann, Michael Howard, and Michael Daily. Fast pattern matching with time-delayed neural networks. In International Joint Conference on Neural Networks (to appear), 2011.

Carmit Hazay and Yehuda Lindell. Efficient protocols for set intersection and pattern matching with security against malicious and covert adversaries. In Proceedings of the 5th conference on Theory of cryptography, TCC'08, pp. 155-175, Berlin, Heidelberg, 2008, Springer-Verlag.

Carmit Hazay and Tomas Toft, Computationally secure pattern matching in the presence of malicious adversaries. In ASIACRYPT, pp. 195-212, 2010.

Yuval Ishai, Manoj Prabhakaran, and Amit Sahai. Founding cryptography on oblivious transfer—efficiently. In Proceedings of the 28th Annual conference on Cryptology: Advances in Cryptology, CRYPTO 2008, pp. 572-591, Berlin, Heidelberg, 2008, Springer-Verlag.

Jonathan Katz and Lior Malka, Secure text processing with applications to private dna matching. In proceedings of the 17th ACM conference on Computer and communications security, CCS '10, pp. 485-492, New York, NY, USA. 2010. ACM.

Knuth, Donald; Morris, James H., jr; Pratt Vaughan (1977). "Fast pattern matching in strings". SIAM Journal on Computing 6(2): 323-350.

Richard M. Karp and Michael O. Rabin. Efficient randomized pattern-matching algorithms, IBM J. Res. Dev., 31:249-260, Mar. 1987.

Pascal Paillier, Public-key cryptosystems based on composite degree residuosity classes, In Proceedings of the 17th international conference on Theory and application of cryptographic techniques, EUROCRYPT'99, pp. 223-238, 1999.

Torben P. Pedersen. Non-interactive and information-theoretic secure verifiable secret sharing. In Proceedings of the 11th Annual International Cryptology Conference on Advances in Cryptology, CRYPTO '91, pp. 129-140, London, UK, 1992, Springer-Verlag.

Structural joins: A primitive for efficient xml query pattern matching. In Proceedings of the 18th International Conference on Data Engineering. ICDE '02, pp. 141-, Washington, DC, USA, 2002. IEEE Computer Society.

Claus-Peter Schnorr. Effieient identification and signatures for smart cards. In Proceedings of the 9th Annual International Cryptology Conference on Advances in Cryprology, CRYPTO '89, pp. 239-252, London, UK, UK, 1990. Springer-Verlag.

Juan Ramón Troncoso-Pastoriza, Stefan Katzenbeisser, and Mehmet Celik. Privacy preserving error resilent dna searching throuhg oblivious automata. In Proceedings of the 14th ACM conference on Computer and communications security, CCS'07, pp. 519-528, New York, NY, USA, 2007, ACM.

Tsung-Hsi Tsai, Average case analysis of the boyer-moore algorithm, Random Struct. Algorithms, 28:481-498, Jul. 2006.

Andrew C. Yao, Protocols for secure computations. In Proceedings of the 23rd Annual Symposium on Foundations of Computer Science, SFCS '82, pp. 160-164, Washington, DC, USA, 1982. IEEE Computer Society.

Andrew Chi-Chih Yao, How to generate and exchange secrets. In Proceedings of the 27th Annual Symposium on Foundations of Computer Science, pp. 162-167, Washington, DC, USA, 1986, IEEE Computer Society.

Joshua Baron, Karim El Defrawy, Kirill Minkovich, Rafail Ostrovsky, and Eric Tressler, 5PM: Secure Pattern Matching. Security and Cryptography for Networks, Lecture Notes in Computer Science, vol. 7485, pp. 222-240, 2012.

Erik Hjelmvik & Wolfgang John, "Statistical Protocol IDentification with SPID: Preliminary Results", SNCNW'09: 6th Swedish National Computer Networking, Uppsala, Sweden. May 4, 2009 <http://spid.sourceforge.net/sncnw09-hjelmvik_john-CR.pdf>.

Martin Roesch: Snort: Lightweight Instusion Detection for Networks, LISA 1999 <http://dblp.dagstuhl.de/db/conf/lisa/lisa1999.html#Roesch99> : 229-238.

"Technical Details of I7-filter"2006, website http://I7.filter.sourceforge.net/technicaldetails.

Khalife. J., Hajjar, A., & Diaz-Vereji, J. (Nov. 2011), On the performance of OpenDPI in Identifying P2P Truncated Flows. In AP2PS 2011, The Third International Conference on Advances in P2P Systems (pp. 79-84).

N. Cascarano, A. Este, F. Gringoli, F. Risso, and L. Salgarelli, "An Expieriemental Evaluation of the Computationl Cost of a DPI Traffic Classifier", Proc. GLOBECOM'09, 2009, pp. 1-8. is related prior art. Sipser, Introduction to the Theory of Computation, PWS, Boston. ISBN 0-534-94728-X, Section 1.1: Finite Automata, pp. 31-47, 1997.

A V Aho, M J Corasick, Efficient string matching: An aid to bibliographic search. Communcations of the ACM, 16(6): 333-340, 1975.

eBayes TCP [Adaptive, Model-based Monitoring for Cyber Attack Detection, Keith Skinner & Alfonso Valdes. Lecture Notes in Computer Science, No. 1907. From Recent Advances in intrusion Detection (RAID 2000). Edited by H. Debar and L. Me and F. Wu. Springer-Verlag, Toulouse, France. Oct. 2000. pp. 80-92.].

K. Koscher, A. Czeskis, F. Roesner, S. Patel, T. Kohno, S. Checkoway, D. McCoy, B. Kantor, D. Anderson, H. Shacham, S. Savage, Expieremental Security Analysis of a Modern Automobile. The IEEE Symposium on Security and Privacy, Oakland, CA, May 16-19, 2010.

Michael Sipser, Introduction to the Theory of Computation. PWS, Boston. 1997. ISBN 0-534-94728-X. Section 1.1: Finite Automata, pp. 31-47.

T Kaneko. O Hori. Template matching method and image processing device. United States Patent 7085418, 2006.

(56) References Cited

OTHER PUBLICATIONS

L. Di Stedano, S. Mattoccia, "A sufficient condition based on the Cauchy-Schwarz inequality for efficient Template Matching", IEEE Int. Conf. on Image Processing (ICIP 2003), Sep. 14-17, 2003, Barcelona, Spain.

L. G. Brown, "A survey of image registration techniques," ACM Comput. Surv., vol. 24, No. 4, pp. 325-376, 1992.

J. J. Hopfield, Neural networks and physical systems with emergent collective computational abilities. Proceedings of the National Academy of Sciences of the USA, vol. 79 No. 8 pp. 2554-2558, Apr. 1982.

P Wang, A DeNunzio, P Okunieff, WG O'Dell, Lung metastases detection in CT images using 3D template matching, Med. Phys. 34 (3). pp. 915, Mar. 2007.

Luigi di Sttefano, Stefano Mattoccia, Federico Tombari, "An Algorithm for Efficient and Exhaustive Template Matching," Jan. 2004; In proceeding of Image Analysis and Recognition: International Conference, ICIAR 2004, Porto, Protugal, Sep. 29-Oct. 1, 2004, Proceedings, Part II.

R.S. Boyer, at al., "A fast string searching algorithm," Communications of the ACM. 20; 762-772, 1977.

M. Zubair, et al., "Text scanning approach for exact string matching," International Conference on Networking and Information Technology, 2010.

M. Sipser, "Introduction to the Theory of Computation," PWS, Boston, ISBN 0-534-94728-X, Section 1.1; Finite Automata, pp. 31-47, 1997.

W. Maass, et al., "Real-time computing without stable states; a new framework for neural computation based on pertubations," Neural Computation 14(11); 5231-2560, 2002.

A.V. Aho et al., "Efficient string matching: An aid to bibliographic search," Communications of the ACM, 18(6): 333-340, 1975.

A. Waibel, et al., "Phoneme Recognition Using Time-Delay Neural Networks," IEEE Transactions on Acoustics, Speech, and Signal Porcessing, 37(3): 328-339, 1989.

J.L. Elman, "Finding structure in time," Cognitive Science, 14(2): 179-211, 1990.

E.M. Izhikevich, "Polychroniation: Computation with spikes," Neural Computation, 18(2): 246-282, 2006.

H. Pugam-Moisy, et al., "Delay learning and polychronization for resevior computing," Neurocomputing, 71 (7-9): 1143-1158, 2008.

W. Maier, et al., "A Minimal Model for the Study of Polychronous Groups," arXiv:0806.1070v1 [Condensed Matter, Disordered Systems and Neural Networks], 2008.

Baruch Awerbuch, Reza Curtmola, David Holmer, Herbert Rubens, and Cristina Nita-Rotaru. On the survivability of routing protocols in ad hoc wireless networks. In IN Proc. of Securecomm05. IEEE, pp. 327-338. IEEE Computer Society Press, 2005.

Joshua Baron, Karim El Defrawy, Kirill Minkovich, Rafail Ostrovsky, and Eric Tressler. 5pm: 5ecure pattern matching. In 8th Conference on Security and Cryptography for Networks (SCN), 2012.

Mario Cagalj, Srdjan Capkun, and Jean-Pierre Hubaux. Key Agreement in Peer-to-Peer Wireless Networks. Proceedings of the IEEE (Special Issue on Security and Cryptography), 94(2), 2006.

Gavin D. Holland, Nitin H, Vaidya, and Patamvir Bahl, A rate-adaptive MAC protocol for multi-hop wireless networks, pp. 236-251, Rome, Italy, Aug. 2001.

C. Danilov T. Henderson J. Ahernholz and J.H. Kim. Core: A real-time network emulator. In IEEE MILCOM Confrence, 2008.

Van Jacobson, Dina K. Smetters, James D. Thornton, Michael F. Plass, Nicholas H. Briggs, and Rebecca L. Braynard. Networking names content. In Proceedings of the 5th international conference on Emerging networking expieremenrs and technologies, CoNEXT '09, pp. 1-12, New York, NY, USA, 2009. ACM.

Jongmin Jeong, Ted Kwon, and Yanghee Choi, Host-oblivious security for content-based networks. In Proceedings of the 5th International Conference on Future Internet Technologies, CFI '10, pp. 35-40, New York, NY, USA, 2010. ACM.

Lalana Kagal and Joe Pato, Preserving privacy based on semantic policy tools, IEEE Security & Privacy, 8(4):25-30, 2010.

Yongdae Kim, Adrian Perrig, and Gene Tsudik. Tree-based group key agreement. ACM Trans. Inf. Syst. Secur., 7:60-96, Feb. 2004.

Tobias Lauinger. Security & Scalability of content-Centric Networking. PhD thesis, TU Darmstadt, Darmstadt, Germany. 2010.

Michael Meisal, Vasileos Pappas, and Lixia Zhang. Ad hoc networking via named data, In Proceedings of the Fifth ACM Workshop on Mobility in the Evolving Internet Architecture (MobiArch), Sep. 2010.

Soon-Young Oh, Davide Lau, and Mario Gerla. Content centric networking in tectical and emergency manets. In Wireless Days, pp. 1-5, 2010.

Pascal Pailier, Public-key cryptosystems based on composite degree residuosity. In Proceedings of the 17th international conference on Theory and application of cryptographic techniques, EUROCRYPT'99, pp. 223-238, Berlin, Heidelberg, 1999. Springer-Verlag.

Panos Papasimitraos, Marcin Poturalski, Patrick Schaller, Pascal Lafourcade, David Basin, Srdjan Capkun, and Jean pierre Hubaux. Secure neighborhood discovery: A fundamental element for mobile ad hoc networking. IEEE Communicaions Magazine, 2008.

Adi Shamir, How to share a secret, Commun. ACM, 22:612-613, Nov. 1979.

D Smetters and V. Jacobson. Securing network content, Technical report, PARC, 2009.

Ion Stoica, Robert Morris, David Karger, M. Frans Kaashoek, and Hari Belakrishnan. Chord: A scalable peer-to-peer lookup service for internet applications. SIGCOMM Comput, Commun. Rev., 31:149-160, Aug. 2001.

Shouhuai Xu and Srdjan C apkun. Distributed and secure bootstrapping of mobile ad hoc networks: Framework and constructions. ACM Trans. Inf. Syst. Secur., 12:2:1-2:37, Oct. 2008.

Amos Beimel, Secret-sharing schemes: A survery. Technical report, 2011.

\* cited by examiner

| T | Text | P | Pattern |
|---|---|---|---|
| C | Client holding P | S | Server holding T |
| $n = |T|$ | length of T | $m = |P|$ | length of P |
| $\Sigma$ | character alphabet | CDV | character delay vector |
| AV | activation vector | X[i] | element i of vector X |

Notation:

$\Sigma$ = character alphabet
$|P|$ = pattern length
$CDV[i]$ = character-delay vector for character i
$AV[i]$ = ith element in $AV$
$T[i]$ = ith character in $T$ $P$ = pattern
$P[i]$ = ith character in $P$
$AV$ = activation vector
$T$ = text
$MP$ = Matching Positions

Input: Pattern:$P$,   Text:$T$,   Output: $MP$ = positions in $T$ where a match begins

200

1- Initialization:

$\forall i \in \Sigma$ :
$\forall i \in \{1,...,|P|\}$ :
$CDV[i][i] = 0$
$\forall i \in \{1,...,|T|\} : AV[i] = 0$
$MP = \{\}$

2- Pattern Pre-processing:

$\forall i \in \{0,...,|P|-1\}$ :
$CDV[P[i]][|P|-i] = 1$

3- Text Processing:

$\forall i \in \{1,...,|T|\}$ :
  $\forall j \in \{0,...,|P|-1\}$ :
    $AV[i+j] = AV[i+j] + CDV[T[i]][j+1]$
  if $AV[i] == |P|$ :   MATCH FOUND
    $MP = MP \cup \{i-|P|\}$
  else:   continue (Prior Art)
FIG. 2

$$M_T \atop n \times \Sigma \quad \cdot \quad {CDV \atop \Sigma \times m} = {M_{T(CDV)} \atop n \times m} = \begin{bmatrix} v_{1,1} & v_{1,2} & \cdots & v_{1,m} \\ v_{2,1} & v_{2,2} & \cdots & v_{2,m} \\ \vdots & \vdots & \ddots & \vdots \\ v_{n,1} & v_{n,2} & \cdots & v_{n,m} \end{bmatrix} \Rightarrow {\overline{M}_{T(CDV)} \atop n \times (n+m-1)} = \begin{bmatrix} v_{1,1} & v_{1,2} & \cdots & v_{1,m} & 0 & \cdots & 0 \\ 0 & v_{2,1} & v_{2,2} & \cdots & v_{2,m} & \cdots & 0 \\ \vdots & \ddots & \ddots & & & \ddots & \vdots \\ 0 & \cdots & 0 & v_{n,1} & v_{n,2} & \cdots & v_{n,m} \end{bmatrix}$$

- 400: $M_T$, $n \times \Sigma$
- 402: CDV, $\Sigma \times m$
- 404
- 406: $M_{T(CDV)}$, $n \times m$
- 408: $\overline{M}_{T(CDV)}$, $n \times (n+m-1)$

FIG. 4

| k | Σ | P | T | Search Time (sec) | Blind Time (sec) | Decrypt Time (sec) | Total Time (sec) |
|---|---|---|---|---|---|---|---|
| 2048 | 36 | 1k | 100k | 1172.50 | 18.55 | 112.41 | 1304.83 |
| 2048 | 36 | 1k | 10k | 106.50 | 1.87 | 11.25 | 119.79 |
| 2048 | 36 | 1k | 1k | 0.00 | 0.21 | 1.13 | 1.40 |
| 2048 | 36 | 100 | 100k | 118.26 | 18.64 | 112.80 | 251.07 |
| 2048 | 36 | 100 | 10k | 11.73 | 1.87 | 11.25 | 25.01 |
| 2048 | 36 | 100 | 1k | 1.05 | 0.21 | 1.12 | 2.44 |
| 2048 | 36 | 100 | 100 | 0.00 | 0.04 | 0.11 | 0.20 |
| 2048 | 36 | 10 | 100k | 11.82 | 18.63 | 112.48 | 144.29 |
| 2048 | 36 | 10 | 10k | 1.19 | 1.87 | 11.23 | 14.45 |
| 2048 | 36 | 10 | 1k | 0.11 | 0.21 | 1.12 | 1.51 |
| 2048 | 36 | 10 | 100 | 0.01 | 0.04 | 0.12 | 0.21 |
| 2048 | 4 | 1k | 100k | 845.53 | 18.53 | 113.52 | 978.94 |
| 2048 | 4 | 1k | 10k | 79.00 | 1.88 | 11.24 | 92.29 |
| 2048 | 4 | 1k | 1k | 0.00 | 0.20 | 1.13 | 1.39 |
| 2048 | 4 | 100 | 100k | 83.83 | 18.55 | 112.53 | 216.27 |
| 2048 | 4 | 100 | 10k | 8.97 | 1.87 | 11.36 | 22.37 |
| 2048 | 4 | 100 | 1k | 0.89 | 0.21 | 1.12 | 2.27 |
| 2048 | 4 | 100 | 100 | 0.00 | 0.04 | 0.11 | 0.20 |
| 2048 | 4 | 10 | 100k | 8.39 | 18.56 | 112.19 | 140.52 |
| 2048 | 4 | 10 | 10k | 0.90 | 1.87 | 11.23 | 14.18 |
| 2048 | 4 | 10 | 1k | 0.10 | 0.21 | 1.13 | 1.50 |
| 2048 | 4 | 10 | 100 | 0.01 | 0.04 | 0.11 | 0.20 |

FIG. 7

| k | Σ | P | T | SearchTime (sec) | Blind Time (sec) | Decrypt Time (sec) | Total Time (sec) |
|---|---|---|---|---|---|---|---|
| 1024 | 36 | 1k | 100k | 373.95 | 5.34 | 32.01 | 411.77 |
| 1024 | 36 | 1k | 10k | 34.12 | 0.54 | 3.20 | 37.90 |
| 1024 | 36 | 1k | 1k | 0.00 | 0.06 | 0.32 | 0.39 |
| 1024 | 36 | 100 | 100k | 39.14 | 5.56 | 31.99 | 77.16 |
| 1024 | 36 | 100 | 10k | 3.76 | 0.54 | 3.20 | 7.55 |
| 1024 | 36 | 100 | 1k | 0.34 | 0.06 | 0.32 | 0.73 |
| 1024 | 36 | 100 | 100 | 0.00 | 0.01 | 0.03 | 0.05 |
| 1024 | 36 | 10 | 100k | 3.83 | 5.35 | 31.98 | 41.61 |
| 1024 | 36 | 10 | 10k | 0.37 | 0.53 | 3.19 | 4.16 |
| 1024 | 36 | 10 | 1k | .04 | 0.06 | 0.32 | 0.42 |
| 1024 | 36 | 10 | 100 | 0.00 | 0.00 | 0.04 | 0.05 |
| 1024 | 4 | 1k | 100k | 266.68 | 5.38 | 32.02 | 304.53 |
| 1024 | 4 | 1k | 10k | 25.35 | 0.55 | 3.20 | 29.15 |
| 1024 | 4 | 1k | 1k | 0.00 | 0.06 | 0.32 | 0.39 |
| 1024 | 4 | 100 | 100k | 26.91 | 5.41 | 31.98 | 64.76 |
| 1024 | 4 | 100 | 10k | 3.00 | 0.57 | 3.20 | 6.81 |
| 1024 | 4 | 100 | 1k | 0.29 | 0.05 | 0.32 | 0.67 |
| 1024 | 4 | 100 | 100 | 0.00 | 0.01 | 0.03 | 0.05 |
| 1024 | 4 | 10 | 100k | 2.70 | 5.39 | 31.89 | 40.43 |
| 1024 | 4 | 10 | 10k | 0.29 | 0.54 | 3.18 | 4.08 |
| 1024 | 4 | 10 | 1k | 0.03 | 0.06 | 0.32 | 0.42 |
| 1024 | 4 | 10 | 100 | 0.00 | 0.01 | 0.03 | 0.05 |

FIG. 8

| Scheme | Client BW | Server BW | Client CC | Server CC | Rounds | Wildcard Matching | Substring Matching | Security Models |
|---|---|---|---|---|---|---|---|---|
| 5PM | $O(nk)$ | $O((n+m)k)$ | $O(mnk \log^2 k)$ | $O(mnk \log k)$ | $O(1)$ | Yes | Yes | M, OS, HBC |
| Ref. No. 15 | $O(nmk)$ | $O(nmk)$ | $O(mnk \log^2 k)$ | $O(mnk \log k)$ | $O(1)$ | Yes | Yes | M, OS, HBC |
| Ref. No. 18 | $O(mk^2)$ | $O(nk + mk^2)$ | $O(n + mk \log^2 k)$ | $O(n + (n+m)k \log^2 k)$ | $O(1)$ | No | No | OS, HBC |

| Scheme | Enc. | Exp. | Mult. | BW | Rounds |
|---|---|---|---|---|---|
| Ref. No. 15 | $O(mn)$ | $O(mn)$ | $O(mn)$ | $O(mnk)$ | 13 |
| 5PM | $O(m+n)$ | $O(mn)$ | $O(mn)$ | $O((m+n)k)$ | 8 |

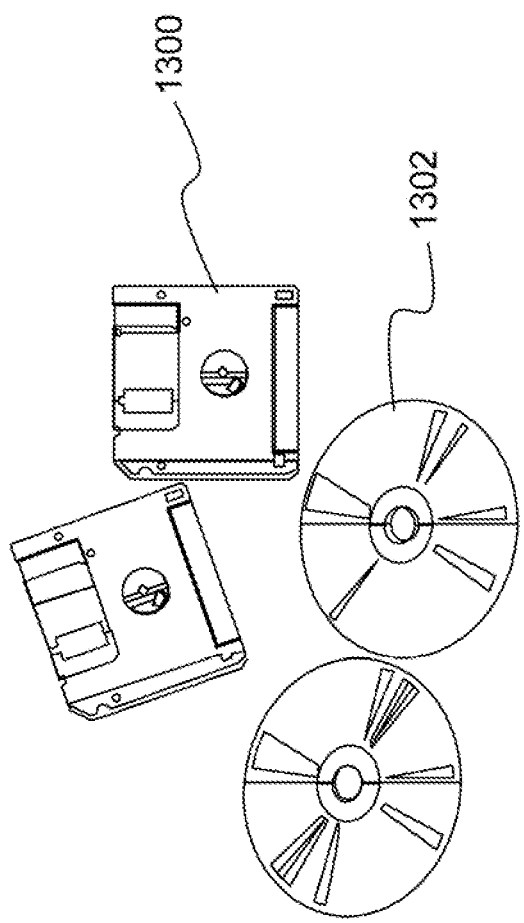

SECURE PATTERN MATCHING

CROSS-REFERENCE TO RELATED APPLICATIONS

This is a Continuation-in-Part application of U.S. Non-Provisional application Ser. No. 13/358,095, filed on Jan. 25, 2012, entitled, "Neural Network Device with Engineered Delays for Pattern Storage and Matching", which is a Non-Provisional patent application of U.S. Provisional Patent Application No. 61/501,636, filed on Jun. 27, 2011, entitled, "Neural Network Device with Engineered Delays for Pattern Storage and Matching." The present application is ALSO a Non-Provisional patent application of U.S. Provisional Patent Application No. 61/591,207, filed Jan. 26, 2012, entitled "Secure Pattern Matching."

BACKGROUND OF THE INVENTION (1) Field of Invention

The present invention relates to a method for secure pattern matching and, more particularly, to a method for secure pattern matching using homomorphic properties of encryption.

(2) Description of Related Art

In computer science, pattern matching is the act of checking some sequence of characters from a fixed alphabet for the presence of the constituents of some pattern. The patterns generally have the form of a sequence of characters. Pattern matching has many applications in computer science including, but not limited to, text-processing, database operations, network filtering, and security applications. It is a problem that has been extensively researched, resulting in several efficient (although insecure) techniques to solve various variations thereof. Prior art schemes for secure pattern matching fall into three groups: ones that rely on homomorphic operations (see the List of Cited Literature References, Literature Reference No. 15), generic methods in secure multiparty computation (see Literature Reference No. 17), or secure finite state machines (FSM) evaluation (see Literature Reference Nos. 2, 11 and 25).

The main disadvantage of the prior art, such as in Literature Reference No. 17, is that it does not efficiently support wildcard match, substring matching, or support the stronger malicious security model. Existing secure pattern matching techniques that depend on securely evaluating FSM (see Literature References No. 2, 11, and 25) require a number of interaction rounds between client and server which are proportional to the number of states in the FSM. This significantly limits the size of FSM that can be evaluated and greatly increases the number of rounds of interaction between client and server. It also renders the usage of wildcards problematic, because they cause a quadratic explosion in the number of states.

Troncoso-Pastoriza, Katzenbeisser, and Celik (see Literature Reference No. 25) developed a secure pattern matching protocol for deoxyribonucleic acid (DNA) analysis by employing oblivious evaluation of automata. The total computation, bandwidth and number of rounds, is linear in n, and their protocol is only secure in the honest-but curious model. Hazay and Lindel (see Literature Reference No. 13) relied on oblivious pseudorandom function (OPRF) evaluation to construct a protocol to perform secure exact pattern matching. Their protocol only achieves a security notion called one-sided simulation, which doesn't model malicious behavior for both the parties. On the other hand, Gennaro et al. (see Literature Reference No. 11) created a secure exact matching scheme in the static malicious model, but they required O(nm) computation and bandwidth complexity.

Katz and Malka (see Literature Reference No. 17) recently proposed a protocol for a generalized pattern matching problem (text processing). In text processing, the party holding the pattern has some additional information, y, and the goal is to learn a function of the text and y for the text locations where p is a substring of the text. Their protocol does not support substring matching or single character wildcards and achieves only one-sided simulation. Their main contribution is to construct a garbled circuit (see Literature Reference No. 27) with size depending on an upper bound of the number of occurrences of the pattern in the text rather than the entire length of the text.

Thus, a continuing need exists for a secure pattern matching method that is efficient in both its speed and memory usage, can handle wildcards, and approximate matches.

SUMMARY OF THE INVENTION

The present invention relates to a system for secure pattern matching. The system comprises one or more processors and a non-transitory memory having instructions such that when the instructions are executed, the one or more processors perform several operations including receiving, as input, a pattern P from a first set of processors, wherein the pattern P comprises a set of characters of an alphabet $\Sigma$. A text T from a second set of processors is received as input, wherein the text T comprises a set of characters of the alphabet $\Sigma$. The first set of processors constructs a matrix (CD) having a plurality of rows, based on values computed for each character in $\Sigma$ that are determined by each character's position in the pattern P. The first set of processors then sends an encrypted matrix E(CDV) and a pattern matching threshold to the second set of processors, wherein E( ) denotes additive homomorphic encryption. The second set of processors processes each character in the text T and retrieves from the encrypted matrix E(CDV) a corresponding row of the encrypted matrix E(CDV), resulting in an encrypted vector. Then, the second set of processors multiplies the encrypted vector with an encrypted activation vector E(AV) having a set of entries. The second set of processors multiplies the pattern matching threshold homomorphically to each of the entries in the activation vector AV to generate a result. The second set of processors exponentiates the result by a random number to blind each entry in the set of entries of E(AV), resulting in creation of $E(AV_S)$. The second set of processors sends $E(AV_S)$ to the first set of processors, and the second set of processors decrypts $E(AV_S)$. Finally, the system demonstrates to the first set of processors where the pattern P matches T, if at all.

In another aspect, the system causes the second set of processors to randomly permute $E(AV_S)$ to hide possible pattern match locations.

In another aspect, the system initializes a threshold encryption scheme between the first set of processors and the second set of processors.

In another aspect, the system causes the first set of processors to construct an encrypted activation vector $E(AV_C)$ for P and T.

In another aspect, the system verities if $E(AV_S)$ and $E(AV_C)$, if decrypted, are equal; and if $E(AV_S)=E(AV_C)$, then the system provides to the first set of processors where the pattern P matches T.

As can be appreciated by one skilled in the art, the present invention also comprises a method for causing a processor to perform the operations described herein.

Finally, the present invention also comprises a computer program product comprising computer-readable instruction means stored on a non-transitory computer-readable medium that are executable by one or more computers having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 1 is a table of notations used in exact matching problems according to the present invention;

FIG. 2 is an illustration of the operation of an insecure pattern matching (IPM) algorithm according to prior art;

FIG. 4 is an illustration of the IPM algorithm as matrix operations according to the present invention;

FIG. 7 is a table of performance results of the 5PM protocol for 1024 bit key length in seconds of a security parameter according to the present invention;

FIG. 8 is a table of performance results of the 5PM protocol for 1024 bit key length in seconds for different settings of a security parameter according to the present invention;

FIG. 10 is a table of complexity comparisons between prior art schemes and the present invention;

FIG. 11 is a table of detailed complexity comparisons between a prior art scheme and the present invention;

FIG. 13 is an illustration of a computer program product according to the present invention.

DETAILED DESCRIPTION

Figure 3:
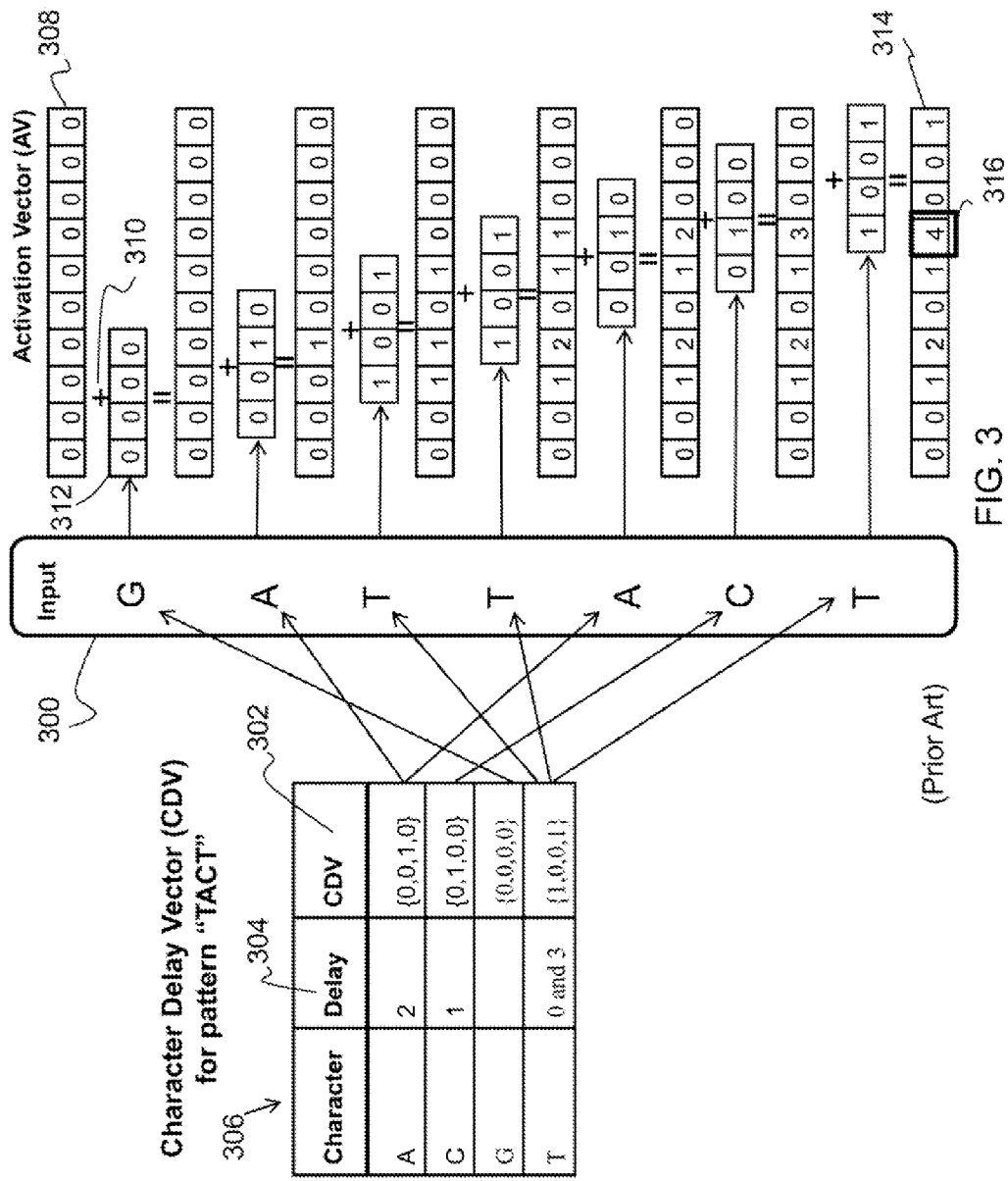
FIG. 3 is an illustration of the IPM algorithm according to prior art.

The present invention relates to a method for secure pattern matching and, more particularly, to a method for secure pattern matching using homomorphic properties of encryption. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Subsequently, an introduction provides the reader with a general understanding of the present invention. Finally, specific details of the present invention are provided to give an understanding of the specific aspects.

(1) List of Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. Alfred V. Aho and Margaret J. Corasick. Efficient string matching: an aid to
bibliographic search. Commun. ACM, 18:333-340, June 1975.
2. Marina Blanton and Mehrdad Aliasgari. Secure outsourcing of dna searching via finite automata. In 24th annual IFIP WG 11.3 working conference on Data and applications security and privacy (DBSec'10), pages 49-64, 2010.
3. Taher El Gamal. A public key cryptosystem and a signature scheme based on discrete logarithms. In Proceedings of CRYPTO 84 on Advances in cryptology, pages 10-18, New York, N.Y., USA, 1985. Springer-Verlag New York, Inc.
4. Ronald Cramer, Rosario Gennaro, and Berry Schoenmakers. A secure and optimally efficient multi-authority election scheme. pages 103-118. Springer-Verlag, 1997.
5. Ivan Damgård. Efficient concurrent zero-knowledge in the auxiliary string model.
In Proceedings of the 19th international conference on Theory and application of cryptographic techniques, EUROCRYPT'00, pages 418-430, Berlin, Heidelberg, 2000. Springer-Verlag.
6. Ivan Damgård and Mats Jurik. A generalisation, a simplification and some applications of paillier's probabilistic public-key system. In Proceedings of the 4th International 7. Ivan Damgård and Claudio Orlandi. Multiparty computation for dishonest majority: from passive to active security at low cost. In Proceedings of the 30th annual conference on Advances in cryptology, CRYPTO'10, pages 558-576, Berlin, Heidelberg, 2010. Springer-Verlag.

8. Jens Groth and Yuval Ishai. Sub-linear zero-knowledge argument for correctness of a shuffle. In Nigel Smart, editor, Advances in Cryptology—EUROCRYPT 2008, volume 4965 of Lecture Notes in Computer Science, pages 379-396. Springer Berlin/Heidelberg, 2008.

9. O. Goldreich, S. Micali, and A. Wigderson. How to play any mental game. In Proceedings of the nineteenth annual ACM symposium on Theory of computing, STOC '87, pages 218-229, New York, N.Y., USA, 1987. ACM.

10. Juan A. Garay, Philip MacKenzie, and Ke Yang. Strengthening zero-knowledge protocols using signatures. In Proceedings of the 22nd international conference on Theory and applications of cryptographic techniques, EUROCRYPT'03, pages 177-194, Berlin, Heidelberg, 2003. Springer-Verlag.

11. Carmit Hazay, Rosario Gennaro, and Jeffery Sorensen. Automata evaluation and text search protocols with simulation based security. In Public Key Cryptography, pages 145-160, 2010.

12. Heiko Hoffmann, Michael Howard, and Michael Daily. Fast pattern matching with time-delayed neural networks. In International Joint Conference on Neural Networks (to appear), 2011.

13. Carmit Hazay and Yehuda Lindell. Efficient protocols for set intersection and pattern matching with security against malicious and covert adversaries. In Proceedings of the 5th conference on Theory of cryptography, TCC'08, pages 155-175, Berlin, Heidelberg, 2008. Springer-Verlag.

14. U.S. Patent Application No. 13,358,095, filed on Jan. 25, 2012, entitled, "Neural Network Device with Engineered Delays for Pattern Storage and Matching."

15. Carmit Hazay and Tomas Toft. Computationally secure pattern matching in the presence of malicious adversaries. In ASIACRYPT. pages 195-212, 2010.

16. Yuval Ishai, Manoj Prabhakaran, and Amit Sahai. Founding cryptography on oblivious transfer—efficiently. In Proceedings of the 28th Annual conference on Cryptology: Advances in Cryptology, CRYPTO 2008, pages 572-591, Berlin, Heidelberg, 2008. Springer-Verlag.

17. Jonathan Katz and Lior Malka. Secure text processing with applications to private dna matching. In Proceedings of the 17th ACM conference on Computer and communications security, CCS '10, pages 485-492, New York, N.Y., USA, 2010. ACM.

18. Knuth. Donald; Morris, James H., Jr; Pratt, Vaughan (1977). "Fast pattern matching in strings". SIAM Journal on Computing, 6(2): 323-350.

19. Richard M. Karp and Michael O. Rabin. Efficient randomized pattern-matching algorithms. IBM J. Res. Dev., 31:249-260, March 1987.

20. K. Namjoshi and G. Narlikar. Robust and fast pattern matching for intrusion detection. In INFOCOM, 2010 Proceedings IEEE, pages 1-9, march 2010.

21. Pascal Paillier. Public-key cryptosystems based on composite degree residuosity classes. In Proceedings of the 17th international conference on Theory and application of cryptographic techniques, EUROCRYPT'99, pages 223-238, 1999.

22. Torben P. Pedersen. Non-interactive and information-theoretic secure verifiable secret sharing. In Proceedings of the 11th Annual International Cryptology Conference on Advances in Cryptology, CRYPTO '91, pages 129-140, London, UK, 1992. Springer-Verlag.

23. Structural joins: A primitive for efficient xml query pattern matching. In Proceedings of the 18th International Conference on Data Engineering, ICDE '02, pages 141-, Washington, D.C., USA, 2002. IEEE Computer Society.

24. Claus-Peter Schnorr. Efficient identification and signatures for smart cards. In Proceedings of the 9th Annual International Cryptology Conference on Advances in Cryptology, CRYPTO '89, pages 239-252, London, UK, UK, 1990. Springer-Verlag.

25. Juan Ramón Troncoso-Pastoriza, Stefan Katzenbeisser, and Mehmet Celik. Privacy preserving error resilient dna searching through oblivious automata. In Proceedings of the 14th ACM conference on Computer and communications security, CCS'07, pages 519-528, New York, N.Y., USA, 2007. ACM.

26. Tsung-Hsi Tsai. Average case analysis of the boyer-moore algorithm. Random Struct. Algorithms, 28:481-498, July 2006.

27. Andrew C. Yao. Protocols for secure computations. In Proceedings of the 23rd Annual Symposium on Foundations of Computer Science, SFCS '82, pages 160-164, Washington, D.C., USA, 1982. IEEE Computer Society.

28. Andrew Chi-Chih Yao. How to generate and exchange secrets. In Proceedings of the 27th Annual Symposium on Foundations of Computer Science, pages 162-167, Washington, D.C., USA, 1986. IEEE Computer Society.

29. Joshua Baron, Karim El Defrawy, Kirill Minkovich, Rafail Ostrovsky, and Eric Tressler. 5PM: Secure Pattern Matching. Security and Cryptography for Networks. Lecture Notes in Computer Science, Vol. 7485, pages 222-240, 2012.

(2) Principal Aspects

The present invention has three "principal" aspects. The first is a system for secure pattern matching. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for secure pattern matching. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(3) Introduction

Pattern matching is fundamental to computer science. It is used in many areas, including text processing, searching databases (see Literature Reference No. 23), networking and security applications (see Literature Reference No. 20), and recently in the context of bioinformatics and DNA analysis (see Literature Reference Nos. 17 and 25). It is a problem that has been extensively researched, resulting in several efficient (although insecure) techniques to solve various variations thereof (see Literature Reference Nos. 1, 18, 19, and 26). The most common interpretation of the pattern matching problem is the following: given an alphabet $\Sigma$, a text $T \in \Sigma^n$ and a pattern $P \in \Sigma^m$, then the exact pattern matching decision problem requires one to decide if a pattern appears at all in the string. The exact pattern matching search problem requires finding all indices i of T (if any) where P occurs as a substring. If $T_i$ denotes the m-character substring of T starting at position i, the output should be the set $\{i|T_i=P\}$.

In addition to the exact matching problem, the following generalizations of the exact matching problem (using the notation in the table 100 shown in FIG. 1) are often encountered in the following applications:

Pattern matching with single character wildcards: There is a special character $* \in \Sigma$ that matches any single character of the alphabet (i.e., $*=a, \forall a \in \Sigma$). This special character can be repeated several times in the pattern $P \in \{\Sigma \cup \{*\}\}^m$. The output in this case should also be the set of indices: $\{i|T_i=P\}$. Using such a "wildcard" character allows one pattern to be specified that could match several sequences of characters. Here and throughout, letters representing deoxyribonucleic acids (DNA) are used as the alphabet (i.e., $\Sigma=\{A,C,G,T\}$). The pattern matching examples are limited to DNA to simplify illustrations. For example the pattern "TA*" (* indicates that any character from the alphabet could be substituted), would match any of the following words in a text: TAA, TAC, TAG, and TAT.

Substring pattern matching: A match for P is found whenever there exists in T an m-length string that differs in n~k characters from P (i.e., has Hamming distance n~k from P). For example, the pattern TAC has m=3. If k=2, then any of the following words would match: *AC, T*C or TA*.

A secure version of pattern matching finds a lot of application in today's privacy aware world that heavily relies on information technology. Protecting database query patterns and information stored in records is currently of high importance. Two concrete examples are presented below that highlight this need.

In a first non-limiting example, secure pattern matching can help solve the problem of data sharing in the intelligence community. Laws and regulations often make it very difficult, or even impossible, for members of the intelligence community to share information in their databases, even when doing so is vital to national security. Mechanisms are highly desired that allow agencies and individuals to request and dispense sensitive information from their databases while maximizing privacy. Secure pattern matching can be used as a building block to build database query primitives that facilitate this without revealing any unnecessary information about the database or the query pattern. The typical setting would be that an information requester will be able to privately query an information provider's database and retrieve only the records that match its query pattern, without revealing the query or its results to the provider. The provider is also interested in not revealing any information other than the matched records.

As a second non-limiting example, secure pattern matching can also help in securing databases containing health information and, specifically, personal DNA sequences. It is highly desired to prevent leakage of such data to certain organizations. At the same time personal DNA sequences have to be used in analysis by (possibly untrusted) third parties. For example, a person carrying a gene known to increase the likelihood of a particular disease may be denied coverage by health insurance or denied employment in certain positions if its DNA sequence is leaked. The need for privacy preserving DNA querying mechanisms has been highlighted in recent research (see Literature Reference Nos. 17 and 25).

The present invention, referred to as 5PM, addresses secure versions of the above pattern matching variations. The security requirements (informally) dictate that the party holding the text learns nothing except the upper-bound on the length of the pattern, while the one holding the pattern only learns either a binary (yes/no) answer for the decision problem or the matching positions (if any), and nothing else.

The present invention shows that the exact matching, exact matching with single character wildcards, and substring matching can all be reduced to certain distributed linear operations. More specifically, the present invention shows that all the above modes can be cast as certain distributed matrix multiplication, where both players generate specific matrices allowing their product to be securely computed by each other. The matrix multiplication product is revealed to the "pattern" player. According to the principles of the present invention the "pattern" player is the Client and the "text" player is the Server. Further, embodiments according to the principles of the present invention show that this matrix product provides to the "pattern" player exactly the desired output and leaks no additional information.

The present invention comprises a secure and efficient protocol (5PM) that can perform exact matching, exact matching with single character wildcards, and substring matching. As will be described in detail below, the present invention provides security proofs of 5PM in both honest-but-curious and malicious adversary models. Extensive performance results for both modes of operation, secure pattern matching with single character wildcards and secure substring matching, are presented and described below.

(4) Specific Details (4.1) Related Work

The principles of the present invention herein describe how to convert a flexible pattern matching (FPM) algorithm (see Literature Reference No. 14) into a secure pattern matching scheme that can be securely evaluated between two parties, $P_1$ and $P_2$. $P_1$ holds a pattern, p, and $P_2$ a text, T. $P_1$ and $P_2$ engage in a protocol that allows $P_1$ to find out whether or not p is present in T. The security and privacy requirements are that $P_2$ does not learn any information about p or whether or not p is present in T. $P_1$ should also not learn any information about T other than whether p is present in it or not. Compared to existing work that has similar functionality, the scheme described in the present invention is the most efficient in terms of communication bandwidth and is equal in terms of computational complexity.

In the most general case, secure exact, approximate and wildcard pattern matching can be implemented using the generic (secure) Multi-Party Computation (MPC) techniques of Yao (see Literature Reference No. 28), Goldreich, Micali and Wigderson (see Literature Reference No. 9), Ishai et al. (see Literature Reference No. 16), and by Damgard and Orlandi (see Literature Reference No. 7). All of these schemes have bandwidth and computational complexity that are quadratic in the text length when the pattern length is a constant fraction of the text length. Since the principles of the present invention are implemented in embodiments where computation of the pattern player is often in the (quadratic) circuit size, these general methods do not apply.

(4.2) Insecure Pattern Matching (IPM) Algorithm

The IPM algorithm performs exact matching and is also able to handle single character wild cards and substring matching, as described below.

Exact Matching: IPM involves the following steps, which are shown in detail in the algorithm 200 and notations 202 illustrated in FIG. 2.

1. Inputs: An alphabet $\Sigma$, a text $T \in \Sigma^n$ and a pattern $P \in \Sigma^m$.
2. Initialization: Construct a vector, here termed a Character Delay Vector (CDV), of length equal to the pattern length, m, for each character in the alphabet, $\Sigma$. Initialize these vectors to be identically zero. For example, if the pattern is: "TACT" then the CDVs will be initialized to:
    CDV[A]=[0, 0, 0, 0]
    CDV[C]=[0, 0, 0, 0]
    CDV[G]=[0, 0, 0, 0]
    CDV[T]=[0, 0, 0, 0].
3. Pattern Pre-Processing: For each character P[i] ($i \in \{1, \ldots, m\}$), a delay value, $d_{p[i]}^r$, is computed to be the number of characters from P[i] to the end of the pattern is computed, i.e., $d_{p[i]}^r = m-i$ where r is the number of occurrences of P[i] in P. The $d_{p[i]}^r$th position of CDV [P[i]] is set to 1. For example the CDVs of "TACT" would be:
    CDV[A]=[0, 0, 1, 0] because $d_A=4-2=2$
    (CDV[C]=[0, 1, 0, 0] because $d_C=4-3=1$
    CDV[G]=[0, 0, 0, 0] because $G \notin P$
    CDV[T]=[1, 0, 0, 1] because $d_T^1=4-4=0$ and $d_T^2=4-1=3$.
    Note that one needs only to construct CDVs for alphabet characters in P, since the rest of the characters will have CDVs with 0s in them.
4. Matching Pass and Comparison with Pattern Length: A vector, called the Activation Vector (AV), of length n+m−1 is constructed, and its elements are initialized to 0. For each input text character T[j] ($j \in \{1, \ldots, n\}$), CDV[T[j]] is added element-wise to the AV at position j to position j+m−1. If T[j] is not present in P it will have a CDV vector of all 0s and nothing is added. After these operations, to determine if there was a pattern match in the text, one checks if AV [j+m−1]=m. If so, then the match started at position j. The value j is added to the set of matching vector positions (MP).

The intuition behind the algorithm is that when an input text character matches a character in the pattern, the algorithm optimistically assumes that the following characters will correspond to the rest of the pattern characters. It then adds a 1 at the position in the activation vector several steps ahead, where it would expect the pattern to end. If all subsequent characters are indeed characters in the pattern, then at the position where a pattern would end the number of added 1s would add up to be equal to the pattern length, otherwise there would be strictly less. This algorithm never gives false positives and always indicates when (and where) a pattern occurs if it exists.

Exact Matching Example: FIG. 3 provides a demonstration of IPM's operation. The pattern to be matched is "TACT", and the input 300 text is "GATTACT." The first step is to construct the CDV 302 using the delays 304 for the characters of the pattern TACT. Referring to table 306, delays for T will be 3 and 0, for A will be 2, and for C will be 1. These delays 304 are then converted to CDVs 302, as shown in table 306. The activation vector (AV) 308 is initialized to all zeros. The characters of the input 300 text are then considered one at a time. For each input text character (ii) at position i in the input 300 text, the following steps are taken: (1) retrieve CDV[$i_i$]; (2) add 310 elements of CDV [$i_i$] 312 (for example) to elements of activation vector 308 (for example) from position i to i+m−1 and (3) check if position d of the activation vector is equal to the pattern length (|TACT|=4). As shown in FIG. 4, the final resulting activation vector 314 is determined once the position d 316 of the activation vector is equal to the pattern length. In other words, a match occurs when "4" is found in the activation vector.

Single Character Wildcards and Substring Matching: Single character wildcards can be handled in IPM by representing the single character wildcard with a special character (e.g., *). When an * is encountered in the pattern pre-processing phase, it is simply ignored. The only modification to the above scheme to handle a pattern with k single character wildcards is that at the last step when elements of the AV are searched, the value being looked for will be |P|−k instead of |P|. The intuition behind single character wildcards is that by reducing the threshold for each wildcard, the algorithm implicitly skips matching that position in the text, allowing it to match any character. This operation does not suffer from any false positives for the same reason that the exact matching IPM algorithm does not: for each pattern P, there is only one encoding into CDV form and only one sequence of adding CDVs as one moves along the text that could add up to |P|. The same holds when * is present in P. For example, if the pattern being looked for was P={GAT*AC*} where the alphabet is the four DNA letters $\Sigma=\{A,C,T,G\}$, then the corresponding CDVs would be: CDV[A]=[0.0, 1, 0, 0, 0, 0], CDV[C]=[0, 0, 0, 0, 1, 0], CDV[T]=[0, 0, 0, 0, 1, 0, 1, 0, 0], CDV [G]=[0, 0, 0, 0, 0, 0, 1], and the value being looked for in the Av would be |P|−k=7~2=5. Considering $T_1=\{GATTACA\}$ and $T_2=\{GATTCCA\}$, $T_1$ will be matched and $T_2$ will be not because instead of an A as its fifth character it has a C and there is no wildcard at the fifth position in P.

Handling substrings of hamming distance P−k from the pattern is handled similarly to single character wildcards; the value being looked for in the AV is decreased to P−k. The difference is that with k single character wildcards there were only m−k CDVs that had to add up to m−k, thus there was only one sequence that could lead to this. When substrings of length k in a pattern of length m are searched for, there are m CDVs which provides $$\binom{m}{k}$$

substrings that could match.

$$\binom{m}{k}$$

is the binomial coefficient, which is an operation from combinatorics:

$$\binom{n}{k} = \frac{n!}{k!(n-k)!} \text{ for } 0.$$

For example, assume that the sub-patterns being looked for are those matching in k=4 places in the pattern P={GATACA}, where the alphabet is the four DNA letters Σ={A,C,T,G}. There will be $$\binom{7}{4} = 35 \text{ such substrings.}$$

=35 such substrings. The protocol of the present invention will correctly identify any of these substrings with a single pass through the text.

How IPM can be converted to matrix and vector operations: For a fixed alphabet Σ, a text T∈Σ$^n$, and pattern P∈(Σ∪{*})$^m$, IPM can be represented in terms of matrix and vector operations as follows and as shown in FIG. 4:

1. T can be transformed into an n×|Σ| matrix: $M_T$ 400. The transformation is performed by applying a unary encoding of the alphabet characters to T (i.e., $M_T[i,T[i]]=1$, $\forall i \in \{1, \ldots, n\}$; all other elements in $M_T$ are 0.
2. The CDVs of the letters of the alphabet can be grouped into a |Σ|×m matrix: $M_{CDV}$ 402. This step is equivalent to constructing the CDVs of the alphabet characters present in the pattern P (Initialization and Pattern Pre-Processing steps described above and in FIG. 2), with 0 vectors where there is no character in the pattern.
3. Multiplying 404 $M_T \cdot M_{CDV}$ results in an n×m matrix $M_{T(CDV)}$ 406 that represents T in terms of CDVs.
4. The algorithm then constructs an n×(n+m−1) matrix $\overline{M}_{T(CDV)}$ 408 where each row contains the corresponding CDV from $M_{T(CDV)}$ 406, but shifted one position to the right successively for each row, with zeros elsewhere. This, with the previous step, is equivalent to shifting the CDVs of the text characters depending on the text character being considered (i.e., Pattern pre-processing).
5. The final step is to sum up the columns of $\overline{M}_{T(CDV)}$ 408 to get the final activation vector AV of length n+m−1 and compare whether any of its elements contain the value |P| (or |P|−k for single character or substring matching). Note that summing up the rows of $\overline{M}_{T(CDV)}$ is equivalent to $[1 \ldots 1]^n \cdot \overline{M}_{T(CDV)}$.

(4.3) Additively Homomorphic and Threshold Encryption

Additively Homomorphic Encryption: Such encryption schemes (see Literature Reference Nos. 6 and 21) and a modified version of ElGamal (see Literature Reference No. 3) are semantically secure encryption schemes with plaintext space P and ciphertext space C that allows addition under encryption: the addition operation (+) can be computed on plaintext by defining a corresponding operation ⊞ on ciphertext which satisfies: $\forall x,y \in P: E(x) \boxplus E(y) = E(x+y)$, where E(x) denotes the homomorphic encryption of plaintext x, $\forall$ denotes "for all", x and y are elements in P, and ∈ denotes set membership. Multiplication by a plaintext constant i is naturally supported by additively homomorphic encryption schemes using repeated doubling and adding: $\forall a \in N, x \in P: aE(x)=E(ax)$, where N is a natural number and a is a number of the set.

Threshold Encryption: To implement the scheme of the present invention in the malicious model, a version of (additively homomorphic semantically secure) threshold encryption is needed. In the two-party case, this means that either party can individually encrypt a message, but both parties must jointly decrypt any message. While the threshold term ElGamal (see Literature Reference No. 15) is used, in practice, any scheme is acceptable so long as semantic security is maintained and the two parties can individually encrypt a message (in an additively homomorphic scheme), but both parties need to participate (sequentially) to decrypt a cipher text.

(4.4) Security Definitions and Adversarial Models

A protocol that performs secure pattern matching on a text T (held by a Server) using a pattern P (held by a Client) can be defined as an interactive two-party protocol. Both parties are assumed to be probabilistic polynomial time (PPT) algorithms. The view of a party in this interactive protocol is a random variable distributed over the coin tosses of that party. A Client's real view is defined as a transcript of the protocol as follows: the Client's view for each round i of interaction is a transcript $$trans^C_{real,i}.$$

For the purposes of the present invention, a "round" is defined as a communication stage where a single specified message (which may consist of multiple sub-messages) is sent over a communication channel by one party.

Formally, Client is a PPT algorithm that at round i+1, outputs:

$$trans^C_{real,i+1} \leftarrow \text{Client}(trans^C_{real,i}, \text{output}^S_{i+1}, \text{output}^C_{i+1}, \text{input}^C_{i+1})$$

where input$_{i+1}$ is its private input for round i+1 and $$\text{output}^C_{i+1} \text{ and output}^S_{i+1}$$

are the Client's and Server's public outputs, respectively. The final view is $$\text{view}_{C,real} = trans^C_{real,l},$$

where l is the final round. The final round of the transcript is where both parties have received their outputs and communication has ceased; the Client's input to the transcript for this round is this output. An auxiliary string r of fixed length (polynomial in the security parameter) that is always included in the transcript is also assumed. Such a model is called the common reference string (CRS) model, which assumes a publicly agreed upon source of randomness (see Literature Reference No. 8).

Definition 1: Let X and Y be distributions over Z. X and Y are computationally indistinguishable, or $X \stackrel{c}{=} Y$, if for every non-uniform (respectively uniform) polynomial-time distinguisher D and for some negligible function δ(k), $$|Pr[D(X)=1]-Pr[D(Y)=1]|<\delta(k).$$

There are two modes of behavior that a cheating party can attempt in such an interactive protocol. The first is called "passive"—namely, the party behaves completely according to the prescribed protocol, but tries on the side to derive whatever information it can about the other party's inputs. The second mode is called "active" (in the static model). In this mode, the cheating party (only one party can cheat throughout the protocol) can send whatever it wants, including an abort call. Security is formally defined for these two models as follows:

Definition 2: Security in Malicious and HBC Adversary Models: A protocol $\pi_{m5pm}$ (respectively (resp.) $\pi_{5pm}$) computing a functionality $F_{5pm}$ between two PPT next message functions Client and Server is called secure in the malicious (resp. Honest But Curious (HBC)) model if:

$\pi_{m5pm}$ (resp. $\pi_{5pm}$) correctly realizes the functionality $F_{5pm}$ except with negligible probability.

For all P and T such that P match T in exactly the same places, for each PPT actively (resp. passively) cheating Client there exists a PPT next message simulator S such that $\text{view}_{C,real} \stackrel{c}{=} \text{view}_{C,S}^C$.

For each PPT actively (resp. passively) cheating Server, there exists a PPT next message simulator S such that $\text{view}_{S,real} \stackrel{c}{=} \text{view}_{S,S}$.

(4.5) Building Blocks

Commitment schemes and zero-knowledge proofs were used as building blocks to construct the protocol $\pi_{m5pm}$. One embodiment of the principles of the present invention relies on commitment schemes between a prover and a verifier. One option would be the Pedersen commitment, which is based on the discrete logarithm assumption. A Pedersen commitment requires agreement on $(q, G_q, g)$. The commitment key is $(g,h)$ where g and h generate $G_q$. The commitment of an element c is accomplished by picking a random r and sending $g^c h^r$. Decommitment is accomplished by supplying c and r to the verifier. Note that this scheme is perfectly hiding and computationally binding. One aspect of the principles of the present invention will use the former scheme (Pedersen commitments) as a commitment scheme for consistency since some of the zero knowledge arguments rely on them.

In constructing a protocol secure against malicious adversaries, various zero knowledge arguments of knowledge are needed, which are outlined below. One may note that they are all constant round and have communication overhead and computational complexity at most linear in their inputs (and in a security parameter). Some of these protocols make use of Pedersen commitments (see Literature Reference No. 22) (or their generalized form, see Literature Reference No. 8) specifically. Some of these protocols are special honest verifier zero knowledge (SHVZK) arguments of knowledge. These can be efficiently transformed into regular (extractable) arguments of knowledge (see Literature Reference Nos. 5 and 10).

1. A protocol $\pi_{DL}$ that demonstrates a prover knows the discrete log of $y=g^x$ given public g and a commitment of y. In particular, given public $(q, G_q, g, y)$, the protocol allows the prover to demonstrate knowledge of an x such that $y=g^x$. Note that one can perform a ZK proof of knowledge of a particular element x which is the same as running $\pi_{DL}$ with y. This protocol can be found in Literature Reference No. 24.

2. A protocol $\pi_{iSBIT}$ that demonstrates that the publicly committed ciphertext the prover has obtained is either an encryption of 0 or 1. Given public $(q, G_q, g, g^r, h, h^r, g^b)$, the prover proves that it knows r and that b is either 0 or 1. This protocol can be found in Literature Reference No. 4.

3. A protocol $\pi_{multiexp}$ that given a public encrypted vector $(E(x_1), \ldots, E(x_n))$ with public commitments $A_1, \ldots, A_n$ of $(y_1, \ldots, y_n)$, respectively, and another encryption E', the prover can demonstrate knowledge that a of a randomization of the encryption $\Pi E(x_i)^{y_i}$ equals E' as well as of the randomness used to generate the commitments. One such implementation of this is in Literature Reference No. 8.

4. A protocol $\pi_{rand}$ that demonstrates that the prover has exponentiated a ciphertext. In practice, this will be used to demonstrate that a prover has randomized the encryption of a (non-zero) message. $\pi_{multiexp}$ is a generalization of this protocol, so $\pi_{rand}$ can be run using a variant of it.

(4.6) 5PM Protocol

The following section provides a detailed description of how to modify IPM to be securely evaluated in both honest-but-curious (HBC) and malicious models. This section begins with describing the HBC version, and then presents the malicious version. Note that for purposes of asymptotic complexity, assume that the size of the alphabet of characters is constant.

(4.6.1) 5PM Intuition

There are two issues that must be addressed to construct a secure version of IPM in the HBC model:

1. Hiding pattern characters: In a secure version of IPM, CDVs have to be constructed for all alphabet characters, otherwise the number of CDVs would leak information about the pattern. In addition CDVs have to be encrypted with those corresponding to alphabet characters not present in the pattern containing randomized encryptions of 0.

2. Hiding everything except matching text positions from Client: A Client receiving an activation vector, AV, can infer information from its elements about the text. By construction, a k in the AV implies that the previous m characters in T (inclusive) have hamming distance m−k from the pattern. Such information leakage violates the security definition. To address this, Server blinds the values of AV after all text characters are processed and their corresponding CDVs are added to AV. This blinding can be easily achieved by subtracting the encrypted pattern length |P| (or |P|−k in the single character wild-card/substring case) so that the only places in the AV corresponding to matches are those places containing 0s. Then each element is randomized by multiplying it by a random number (if this element is encrypted in an additive scheme, it is exponentiated by a random number). The positions representing matches will remain 0 while other positions will be mapped to random numbers that do not reveal anything about the text other than a non-match. If it is required that Client only learns the number of occurrences of the pattern in the text, one can randomly permute the AV to hide the matched positions.

(4.6.2) Honest-But-Curious (HBC) 5PM Protocol

Figure 5:
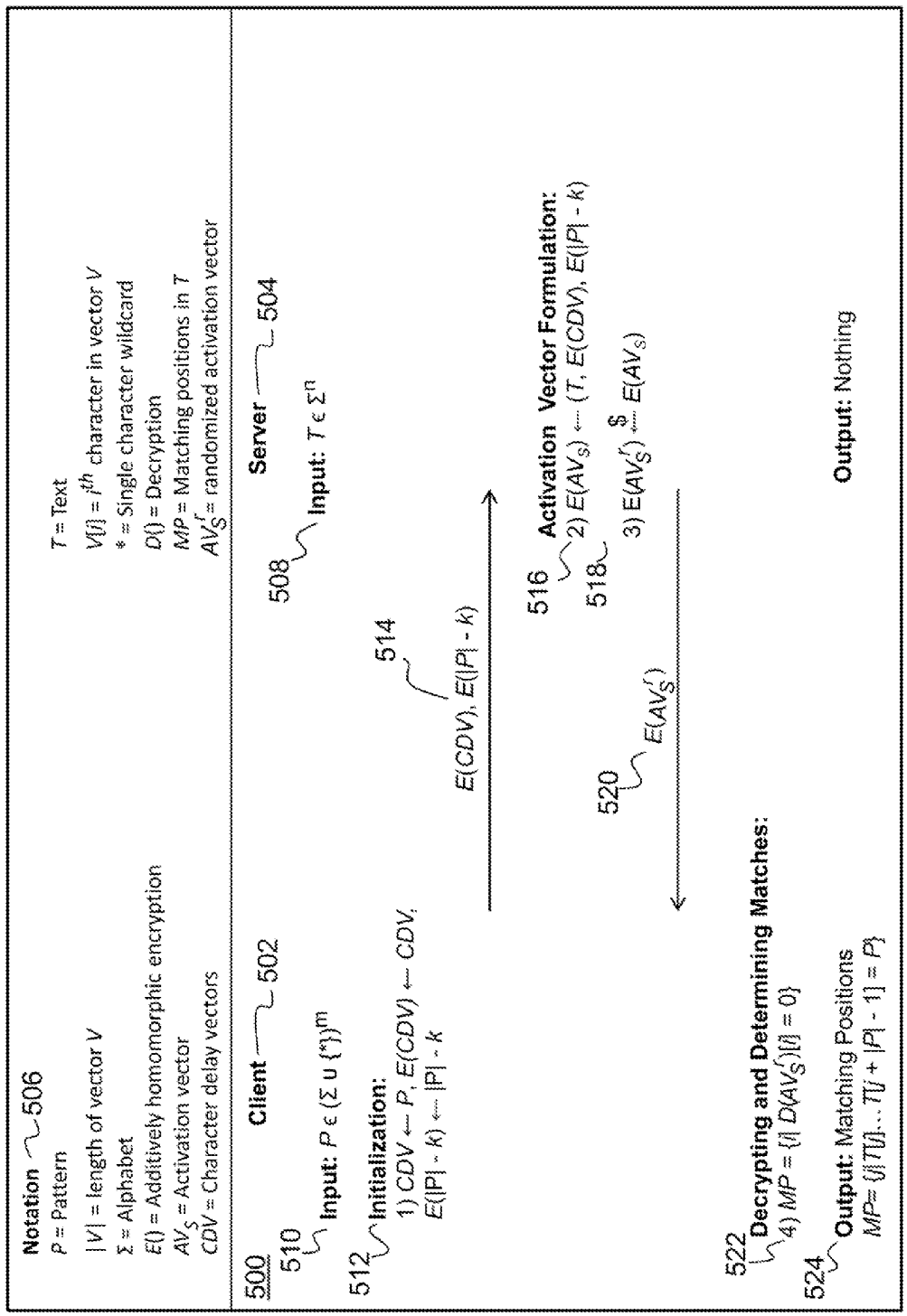
FIG. 5 is an illustration of the IPM protocol for an honest-but-curious (HBC) model according to the present invention.

FIG. 5 contains a detailed description of the 5PM protocol 500 when executed between a Client 502 and a Server 504 as well as the notations 506 used for reference. Recall that an alphabet $\Sigma$ was specified, the Server holds $T \in \Sigma^n$ 508 as an input, and the Client holds $P \in (\Sigma \cup \{*\})^m$ 510 as an input, where m is the length of the pattern P and * denotes the wildcard character. The output is an encrypted activation vector E(AV) of length n+m−1. The steps involved are:

1. During initialization 512, the Client, C, computes delays associated with each character in $\Sigma$ and constructs the (sometimes all 0) matrix $M_{CDV}$, which will be called CDV.

2. The Client takes E(CDV), which is encrypted element-wise using an additively homomorphic encryption scheme (e.g., Paillier or additive ElGamal).

3. The Client then sends E(CDV) to the Server. In addition, the Client sends E(−|P|) (or E(−|P|+k) (i.e., pattern matching threshold) in the single character wildcard or substring cases (operations represented as reference number 514 in FIG. 5). k can be 0 in the exact match case and 0 in the character wildcard or substring cases (k=w+1), where w is the number of wildcards and 1 is the number of places where the pattern cannot match the text and yet the protocol will still yield a match.

4. For $1 \leq i \leq n$, the Server considers each character in the text T[i] and retrieves the corresponding ith row of E(CDV). This is the step that corresponds to multiplying $M_T \cdot M_{CDV}$, as described above. The resulting vectors are multiplied with the encrypted activation vector E(AV) element-wise in places $i, \ldots, i+m-1$ of the AV. This is the step corresponding to transforming $M_{T(CDV)}$ to $\overline{M}_{T(CDV)}$, and then performing the multiplication $[1 \ldots 1]^n \cdot \overline{M}_{T(CDV)}$ to get the final AV. Note that multiplication of the ciphertexts implies addition of the encrypted messages.

5. The Server then multiplies $E(-|P|)(=E(|P|)^1)$ homomorphically to each of the entries in AV and exponentiates the result by a randomly chosen number to blind entries in E(AV). Note that a fresh random number has to be chosen for each entry. This vector is called $E(AV_s)$ (operations represented by reference number 516 in FIG. 5).

6. Optional: Server randomly permutes $E(AV_s)$ to hide the possible pattern match locations (operation represented by reference number 518 in FIG. 5, where S denotes "selected uniformly at random").

7. The Server sends $E(AV_S)$ to the Client 520.

8. The Client decrypts $E(AV_S)$ 522. If a 0 exists, this means that a match occurred (in the previous m places of T) (represented by reference number 524 in FIG. 5).

(4.6.3) Malicious Model 5PM Protocol

Figure 6A:
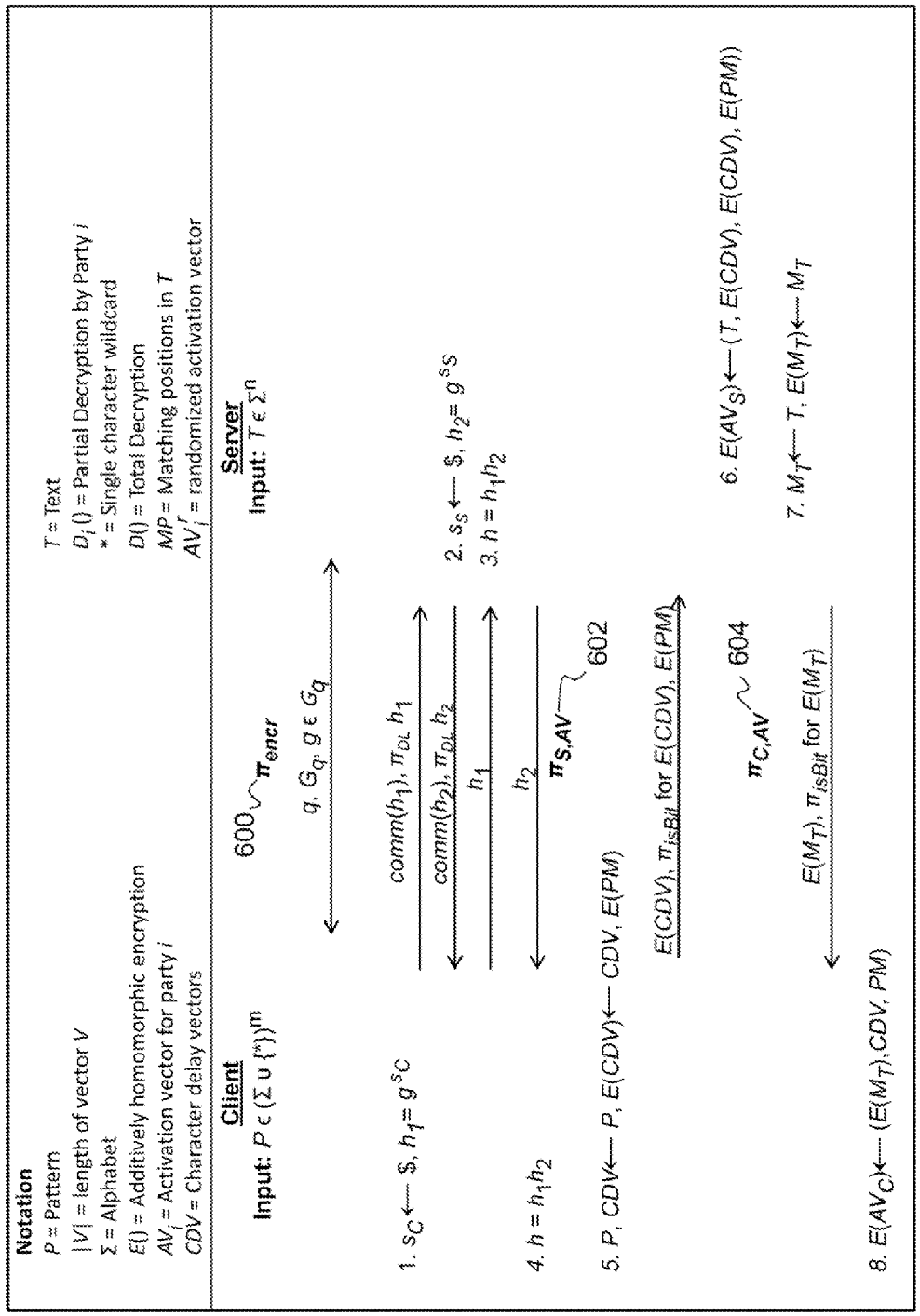
FIG. 6A is an illustration of a first part of the 5PM protocol for a malicious adversary model according to the present invention.
Figure 6B:
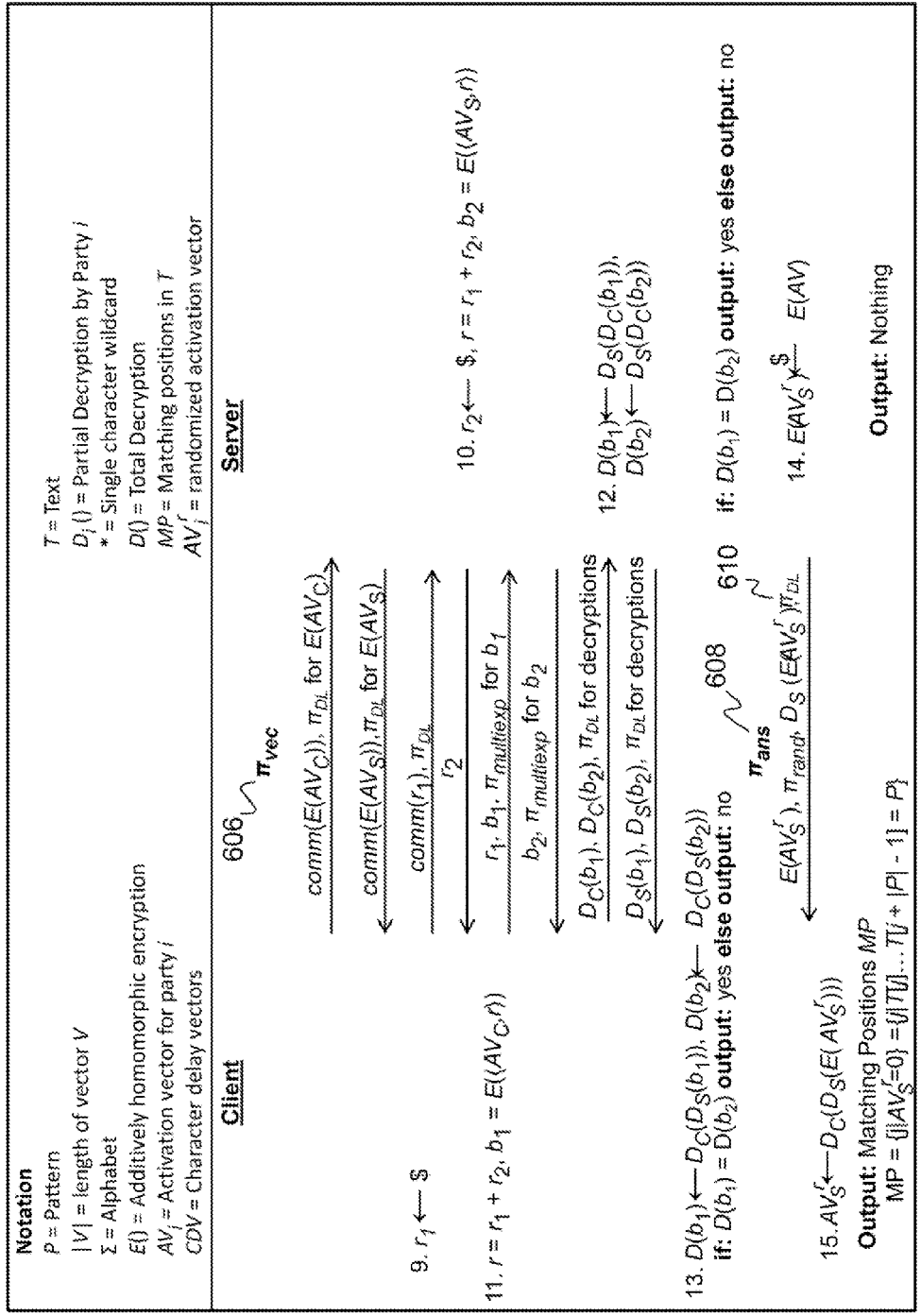
FIG. 6B is an illustration of a second part of the 5PM protocol for a malicious adversary model according to the present invention.

One embodiment of the principles of the present invention modifies the above scheme to obtain a protocol $\pi_{m5pm}$ that is secure in the (static) malicious model. One embodiment of the principles of the present invention breaks the protocol into five subprotocols: the first subprotocol ($\pi_{encr}$) initializes a threshold encryption scheme, the second ($\pi_{S,AV}$) allows the Server to create an encrypted activation vector for P and T, the third ($\pi_{C,AV}$) allows the Client to also construct an encrypted activation vector for P and T, the fourth ($\pi_{vec}$) checks that the vectors, if decrypted, are the same, and the final subprotocol ($\pi_{ans}$) demonstrates to the Client where the pattern P matches T, if at all. FIGS. 6A and 6B illustrate the $\pi_{m5pm}$ protocol.

Malicious model subprotocols. As depicted in FIG. 6A, $\pi_{encr}$ 600 is a two-party protocol computing a functionality $F_{encr}$ that initializes a two-party distributed ElGammal encryption scheme. Parties Client and Server agree on $G_q$ and $g \in G_q$. Client input is $G_q, q \in G_q, s_c$, and Server input is $G_q, q \in G_q, s_s$. Protocol output to both Client and Server is $h = g^{s_c} g^{s_s}$. The steps of the subprotocol include the following:

1. Client randomly selects an exponent of $g \in G_q$, $s_C$, and sends a commitment $h_1 = g^{S_c}$ as well as a ZK argument of knowledge, $\pi_{DL}$ that it is formatted correctly.

2. Server randomly selects an exponent $s_s$ and sends the Client $h_2 = g^s{}_s$ as well as a ZK argument of knowledge, $\pi_{DL}$.

3. Client decommits $h_1$ to the Server.

4. Both parties set the public key $h = h_1 h_2$, with secret key is $s = s_C + s_S$.

$\pi_{S,AV}$ 602 is the two-party protocol computing a functionality $F_{S,AV}$. Client input is P, and Server input is T. There is no output to the Client. Output to the Server is $E(AV_s)$, an encrypted activation vector corresponding to P and T. The steps of the subprotocol include the following:

1. Client forms the CDV matrix for P and sends E(CDV) to the Server.

2. Client also sends an encryption E(PM), which is the threshold that the activation vector is to reach in order to indicate a match.

3. Client proves that E(CDV) and the product of each of its columns are each a 0 or a 1 to prove that it was formatted correctly (at most one 1 per column, and 0s elsewhere) using $\pi_{isBIT}$ for each proof.

4. Using E(CDV), T and E(PM), the Server computes $E(AV_s)$ as it did in the HBC protocol.

This subprotocol is the same as the HBC 5PM protocol, $\pi_{5pm}$, except that the Client runs $\pi_{isBit}$ to prove validity, and the Server does not return $E(AV_s)$ to the Client.

$\pi_{C,AV}$ 604 is a two-party protocol computing a functionality $F_{C,AV}$. Client input is P, and Server input is T. The Server receives nothing, while the output to the Client is $E(AV_C)$ an encrypted activation vector corresponding to P and T. The steps of the subprotocol include the following:

1. Server forms $M_T$ from T as described above and sends $E(M_T)$ to the Client. To demonstrate that $E(M_T)$ is formatted correctly, with all encryptions being zero except for exactly one 1 per column, the Server runs $\pi_{isBit}$ on each encryption of $E(M_T)$ and on each of the in column-wise products.

2. Client computes $E(AV_C)$ by first taking $M_{CDV} \cdot E(M_T)$. This can be done by recognizing that one can obtain an encryption of the dot product of an unencrypted vector $(x_1, \ldots, x_m)$ with an encrypted vector $(E(y_1), \ldots, E(y_m))$ by taking $\cup E(y_i)^{x_i} = E(\Sigma x_i y_i)$. The Client obtains the n encrypted CDV vectors that correspond to the n characters of T and adds them to his $AV_C$. Then E(PM) is divided from each encryption to obtain $E(AV_C)$.

As shown in FIG. 6B, which is a continuation of FIG. 6A, $\pi_{vec}$ 606 is a two-party protocol computing a functionality $F_{vec}$. The Client input is $E(AV_C)$. The Server input is $E(AV_S)$. Output to both Client and Server is yes if $AV_C = AV_S$, no otherwise. The steps of the subprotocol include the following:

1. Client commits to $E(AV_C)$ and sends a proof of knowledge $\pi_{DL}$ of it as well.

2. Server commits to $E(AV_S)$ and also sends a proof of knowledge $\pi_{DL}$.

3. Client picks $r_1 \in \{0, 1\}^{k(n+m-1)}$ randomly and sends a proof of knowledge of it to the Server.

4. Server picks $r_2 \in \{0, 1\}^{k(n+m-1)}$ randomly and sends it to the Client.

5. Client decommits $r_1$, sending $r_1$ to the Server. Both parties set $r = r_1 + r_2$.

6. Client generates $b_1 = E(<AV_C, r>)$, which is a dot product taken over $Z_{2^k}$. Client sends $b_1$ to the Server along with $\pi_{multexp}$, which is a ZK argument of knowledge that $b_1$ was obtained correctly.

7. Server generates $b_2 = E(<AV_S, r>)$. Server sends $b_2$ to the Client along with $\pi_{multexp}$, which is a ZK argument of knowledge that $b_2$ was obtained correctly.

8. Client sends its partial decryptions of $b_1$ and $b_2$ to the Server along with zero knowledge arguments $\pi_{DL}$ that they were obtained correctly.

9. Server sends its partial decryptions of $b_1$ and $b_2$ to the Client along with zero knowledge arguments $\pi_{DL}$ that they were obtained correctly.

10. Both parties fully decrypt $b_1$ and $b_2$ and check if they equal. For each party, if the decryptions equal each other, the output is yes, else the answer is no.

If r is obtained randomly, then only with probability $1/2^k$ will two non-equal vectors have equal dot product with r.

$\pi_{ans}$ 608 is a two-party protocol computing a functionality $F_{ans}$. The Client input is yes (or nothing), and the Server input is $E(AV_S)$ and yes. Protocol output is Nothing to the Server, $AV_S$ to the Client. The steps of the subprotocol include the following:

1. If the Server output is a yes, he raises each encryption in $E(AV_S)$ to a random exponent (which, by homomorphic properties, multiplies the messages by random numbers). This vector is called $E(AV_S{}^r)$. Server sends $E(AV_S{}^r)$ to Client along with ZK argument $\pi_{rand}$ for each encryption in $E(AV_S{}^r)$ that it was obtained correctly (recall that the Server already committed to $E(AV_S)$ in the previous subprotocol).
2. If the Client did not obtain yes in the previous subprotocol, he does not participate in $\pi_{rand}$ and the protocol ends.
3. The Server sends his partial decryption of $E(AV_S{}^r)$ to the Client along with a ZK argument $\pi_{fin}$ of its validity.

Using the subprotocols above, one embodiment of the principles of the present invention now presents the protocol $\pi_{m5pm}$ that, on Client's input pattern P and Server's input text T, outputs to the Client the locations (if any) where P matches T.

1. Client and Server run $\pi_{encr}$ 600 to setup the encryption scheme E (which is threshold ElGamal) with $G_q,g$, $sk=s_c+s_p$ and $h=g^{s_c}g^{s_p}$. The ElGamal encryption system is an asymmetric key encryption algorithm for public-key cryptography.
2. Client, with E(CDV), and Server, with T, run $\pi_{S,AV}$ 602 for the Server to privately obtain E(A vs), an encrypted activation vector.
3. Client, with CDV, and Server, with $E(M_T)$, run $\pi_{C,AV}$ 604 (this can be run concurrently with the above step) for the Client to privately obtain $E(AV_C)$, its own activation vector.
4. Client and Server run $\pi_{vec}$ 606 on $E(AV_C)$ and $E(AV_S)$.
5. If Client and Server have accepted the outcome of $\pi_{vec}$, Client runs $\pi_{ans}$ 608 to obtain the Server's $AV_S{}^r$.

Protocol Efficiency: The overall bandwidth is dominated by the $O(m|\Sigma|)$ encrypted values that the Client sends to the Server in $\pi_{S,AV}$ and the $O(n+m-1)$ encrypted values that the Server sends to the Client in $\pi_{C,AV}$ and $\pi_{ans}$, where O indicates asymptotic complexity. $|\Sigma|$ is considered to be a constant; therefore, the bandwidth is $O((n+m-1)k)$ for security parameter k. The computational complexity for the Client is dominated by the subprotocol $\pi_{C,AV}$, as the Client takes O(nm) exponentiations of encrypted elements, and the computational complexity for the Server is dominated by the subprotocols $\pi_{S,AV}$ as the Server takes O(nm) multiplications of encrypted elements and in $\pi_{vec}$ and $\pi_{ans}$, where the Server takes O(n) exponentiations of encrypted elements. There are 5 subprotocols, where $\pi_{C,AV}$ and $\pi_{S,AV}$ can be run concurrently. Since each subprotocol takes 2 rounds, the whole protocol takes 8 rounds. For the purposes of the present invention, a "round" is defined as a communication stage where a single specified message (which may consist of multiple sub-messages) is sent over a communication channel by one party.

(4.7) Security and Performance Analysis
(4.7.1) Security in the HBC Model
Theorem 1: If there exist additively homomorphic semantically secure encryption schemes, then the protocol $\pi_{5pm}$ computing functionality $F_{5pm}$ is secure in the HBC model.

Cheating Client: It is presented herein what the simulator S does in the case of a cheating client. Additionally, it is shown that the transcripts are indistinguishable. A pattern P and a text T are fixed such that P matches T in precisely the places allowed from the definition.

1. Client possesses a pattern P, converts it to a CDV matrix, and sends E(CDV) to S. Output for the transcript is P, CDV, E(CDV).
2. S chooses consistently the same text T. This T also matches P in the same places as T but is distinct from T.

S computes the encrypted, randomized AV, $E(AV^r)$, from T and P and sends it to the Client. Output for the transcript is $E(AV^r)$.
3. Client outputs the unencrypted output vector, $AV^r$.

Since the encrypted CDV in the real and simulated transcripts are the same, and the encrypted AV sent out is randomized such that any two patterns can have the same output unencrypted randomized AV, the real and simulated transcripts are computationally indistinguishable.

Cheating Server: Presented below is what the simulator S does in the case of a cheating Server. Additionally, it is shown that the transcripts are indistinguishable. A pattern P and a text T are fixed of appropriate length.

1. S takes any arbitrary pattern (of the same length as allowed) P', computes the CDV matrix for P', and sends its encryption, E(CDV) to the Server. Output for the transcript is E(CDV).
2. The Server computes the randomized encryption of the AV based on its text T and the CDV based on P', and outputs this encryption. Output for the transcript is T,E (AV) $E(AV^r)$.

Since a distinguisher cannot distinguish between two semantically secure encryptions, and the encrypted, randomized AV is based purely on algebraic operations on the encrypted CDV, a distinguisher cannot distinguish between real and simulated transcripts. To do so would imply the ability to distinguish between the encrypted CDV based on P and the encrypted CDV/based on P', which violates the definition of semantic security.

(4.7.2) Security in the Malicious Model
Theorem 2: If there are semantically secure additively homomorphic threshold homomorphic encryptions schemes, then $\pi_{m5pm}$ secure in the (static) malicious model.

One may prove the theorem by demonstrating round by round what the simulator will do. Pick a P for the Client and a T for the Server such that P and T match exactly in the previously agreed upon places (fixed by the definition). By a hybrid argument, if at each round of communication the views are computationally indistinguishable, then the entire view must be as well. Without loss of generality, one may prove the theorem for exact matching since the protocol differs very slightly for wildcards and for substring matching. Please refer to Literature Reference No. 30 for a detailed description of the proof of this theorem.

(4.8) Implementation and Performance Analysis
In one aspect, the present invention illustrates the honest-but-curious version of 5PM1 in C++ using publicly available libraries. In one aspect, the present invention used Fast-decryption Paillier from the SFS package version 0.8 (see Literature Reference No. 21), the Paillier encryption algorithms from the Paillier Library 0.8 from the Advanced Crypto Software Collection, and an implementation of additive ElGamal (see Literature Reference No. 3). It was determined that, for a security parameter of 1024 bit key length in seconds, the Fast-decryption Paillier could decrypt 10× faster than the regular Paillier and 3× faster than additive ElGamal. Since the performance of the scheme described herein is dominated by the decryption time, the Fast-decryption Paillier decryption scheme was chosen.

In another aspect, the present invention also employed the GNU Multiple Precision (GMP) Arithmetic Library 5.0.1 for calculations. Testing was performed on an Intel dual quad-core 2.93 GHz machine with 8 GB of memory running Ubuntu Linux version 10.10. The results of the testing with the Fast-decryption Paillier scheme are shown in tables 700 and 800 in FIGS. 7 and 8, respectively. Specifically, table 700 displays performance results for 2048 bit key length in seconds (sec) of the security parameter k, the alphabet Σ, the query pattern P, and the text T. Table 800 depicts performance results for 1024 bit key length in seconds for a different setting of the security parameter k, the alphabet Σ, the query pattern P, and the text T.

As shown in FIGS. 7 and 8, on average, 95% of the total runtime was spent in the following three parts of the algorithm: searching the text (i.e., search time), blinding the activation vector (i.e., blind time), and decryption (i.e., decrypt time). The key generation time and the CDV initialization time were not included, because they could be precomputed. The computation of the CDV initialization is constructed from a series of encrypted 1s and 0s and, hence, can be precomputed by storing a vector of encryptions of 1s and a vector of encryptions of 0s. The online part of the algorithm is broken into server-side computation, the searching and blinding, and client-side decryption.

Figure 9:
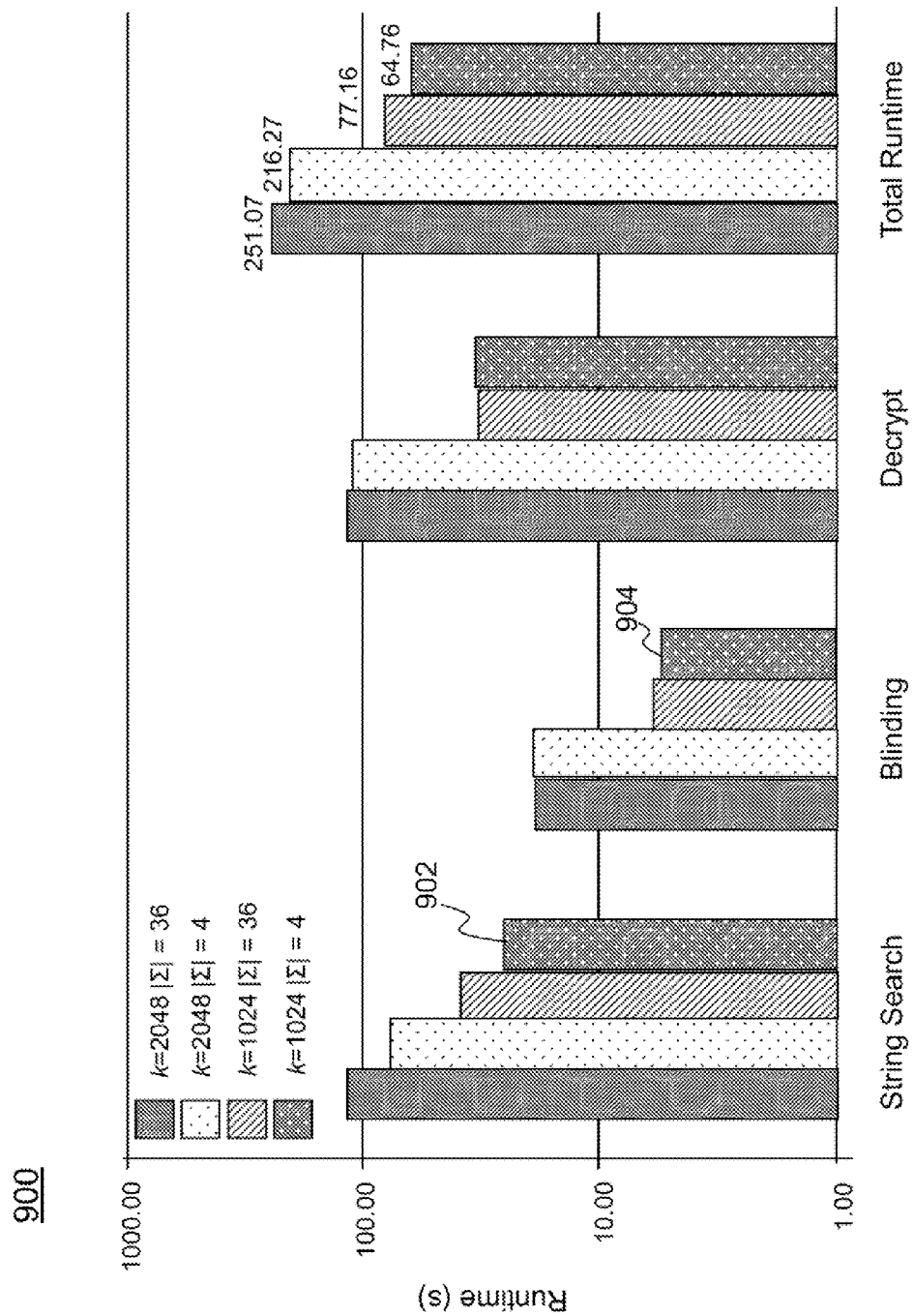
FIG. 9 is a graph depicting log-scale runtime breakdown in seconds for the 5PM protocol according to the present invention.

The search time depends on the homomorphic addition performance, the size of the input, and the size of the query. The blinding time is dependent on the homomorphic addition performance and the size of the input. The decryption time is dependent on the decryption time and the size of the input. FIG. 9 illustrates a log-scale runtime breakdown in seconds for a query of size 100 and a text of size 100K. The graph 900 in FIG. 9 highlights how the security parameter and the alphabet size affect the runtime with a query of size 100 and the text of size 100K. The graph 900 shows that, for k=1024 and using the DNA alphabet (i.e., Σ=4), embodiments of the principles of the present invention can perform string search with wildcards in 27 seconds (bar 902) and blinding in 6 seconds (bar 904). These results further show that aspects of the principles of the present invention are effective in performing secure text searching with and without wildcards.

FIG. 10 presents a table 1000 providing a detailed complexity comparison of the principles of the present invention (5PM) with Literature Reference Nos. 14 and 17. The Literature Reference No. 17 threshold is set at n. The comparison assumes both schemes use k-bit ElGamal (see Literature Reference No. 3). k is the security parameter; for an encryption scheme, it is the key size. Literature Reference No. 17 uses k'-symmetric encryption. Referring to the table 1000, BW denotes bandwidth, CC denotes computational complexity, M denotes malicious adversary model, OS denotes one-sided security model, and HBC denotes honest-but-curious adversary model. Compared to the most efficient algorithm that can securely perform wildcard and substring search, which is Reference No. 14, the present scheme (5PM) matches it in every way. However, aspects according to the principles of the present invention reduce the communication bandwidth from O(mnk) to O(n+m)k, where m is the pattern length and n is the text length.

The table 1100 of FIG. 11 contains a more detailed comparison of the principles of the present invention with Reference No. 14. In the table 1100, comparison assumes both schemes use k-bit ElGamal. Enc denotes encryption, Exp denotes exponentiation, Mult denotes multiplication, and BW denotes bandwidth. The basic idea of the protocol in Reference No. 14 is that the two parties securely convert the binary representation of their pattern and text into elements of $Z_q$ and reduce the pattern matching problem to that of comparing two elements of $Z_m$ (embedded into $Z_q$). The main contribution of Reference No. 14 is a secure pattern matching protocol that allows for single character wildcards in the static malicious model.

Figure 12:
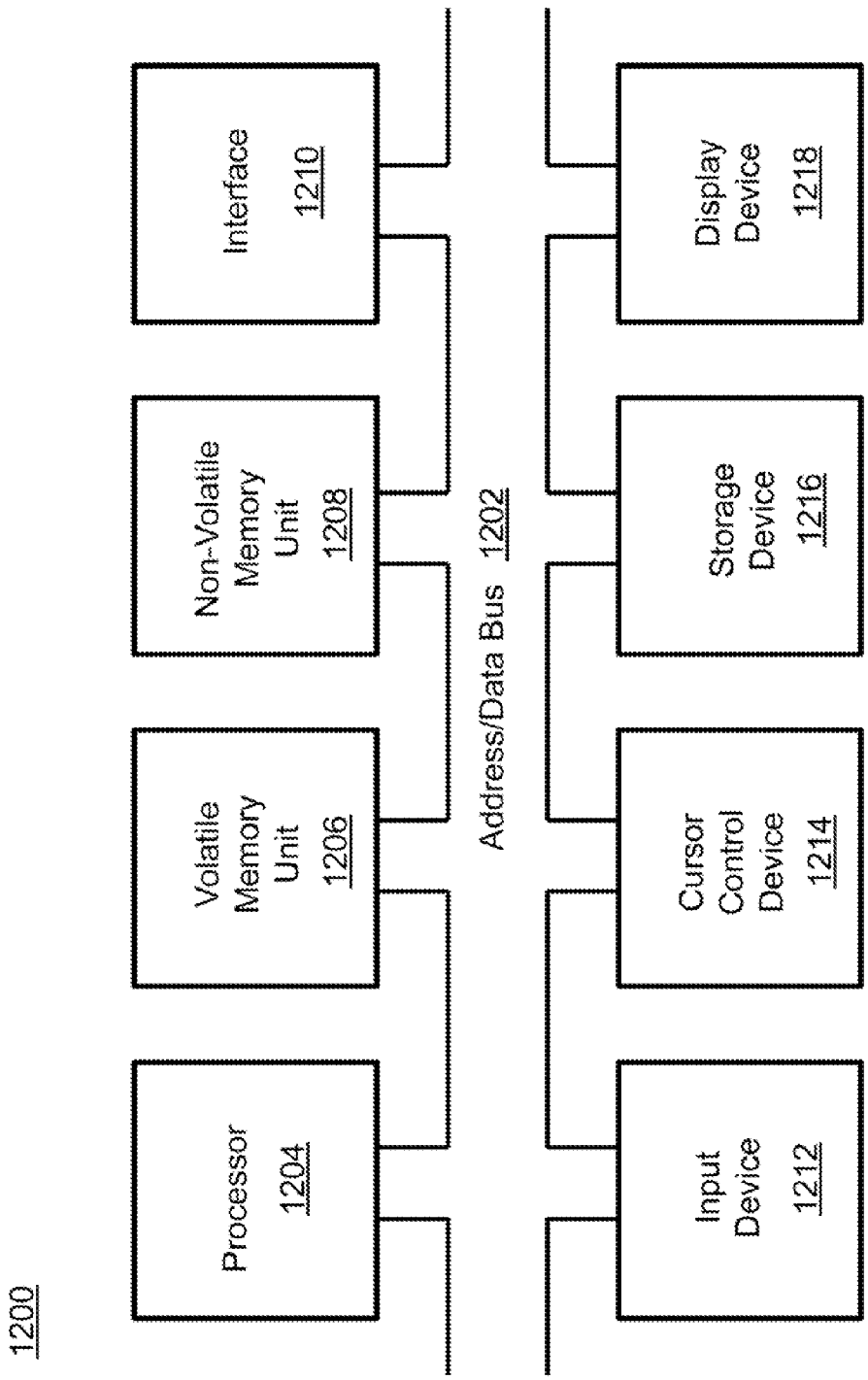
FIG. 12 is an illustration of a data processing system according to the present invention.

An example of a computer system 1200 in accordance with one aspect is shown in FIG. 12. The computer system 1200 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 1200. When executed, the instructions cause the computer system 1200 to perform specific actions and exhibit specific behavior, such as described herein.

The computer system 1200 may include an address/data bus 1202 that is configured to communicate information. Additionally, one or more data processing units, such as a processor 1204, are coupled with the address/data bus 1202. The processor 1204 is configured to process information and instructions. In one aspect, the processor 1204 is a microprocessor. Alternatively, the processor 1204 may be a different type of processor such as a parallel processor, or a field programmable gate array.

The computer system 1200 is configured to utilize one or more data storage units. The computer system 1200 may include a volatile memory unit 1206 (e.g., random access memory ("RAM"), static RAM, dynamic RAM, etc.) coupled with the address/data bus 1202, wherein the volatile memory unit 1206 is configured to store information and instructions for the processor 1204. The computer system 1200 further may include a non-volatile memory unit 1208 (e.g., read-only memory ("ROM"), programmable ROM ("PROM"), erasable programmable ROM ("EPROM"), electrically erasable programmable ROM "EEPROM"), flash memory, etc.) coupled with the address/data bus 1202, wherein the non-volatile memory unit 1208 is configured to store static information and instructions for the processor 1204. Alternatively, the computer system 1200 may execute instructions retrieved from an online data storage unit such as in "Cloud" computing. In one aspect, the computer system 1200 also may include one or more interfaces, such as an interface 1210, coupled with the address/data bus 1202. The one or more interfaces are configured to enable the computer system 1200 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 1200 may include an input device 1212 coupled with the address/data bus 1202, wherein the input device 1212 is configured to communicate information and command selections to the processor 1200. In accordance with one aspect, the input device 1212 is an alphanumeric input device, such as a keyboard, that may include alphanumeric and/or function keys. Alternatively, the input device 1212 may be an input device other than an alphanumeric input device. In one aspect, the computer system 1200 may include a cursor control device 1214 coupled with the address/data bus 1202, wherein the cursor control device 1214 is configured to communicate user input information and/or command selections to the processor 1200. In one aspect, the cursor control device 1214 is implemented using a device such as a mouse, a track-ball, a track-pad, an optical tracking device, or a touch screen. The foregoing notwithstanding, in one aspect, the cursor control device 1214 is directed and/or activated via input from the input device 1212, such as in response to the use of special keys and key sequence commands associated with the input device 1212. In an alternative aspect, the cursor control device 1214 is configured to be directed or guided by voice commands.

In one aspect, the computer system 1200 further may include one or more optional computer usable data storage devices, such as a storage device 1216, coupled with the address/data bus 1202. The storage device 1216 is configured to store information and/or computer executable instructions. In one aspect, the storage device 1216 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 1218 is coupled with the address/data bus 1202, wherein the display device 1218 is configured to display video and/or graphics. In one aspect, the display device 1218 may include a cathode ray tube ("CRT"), liquid crystal display ("LCD"), field emission display ("FED"), plasma display or any other display device suitable for displaying video and/or graphic images and alphanumeric characters recognizable to a user.

The computer system 1200 is presented herein as an example computing environment in accordance with one aspect. However, the example computer system 1200 described herein is not strictly limited to being a computer system. For example, one aspect provides that the computer system 1200 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various embodiments of the present technology are controlled or implemented using computer-executable instructions, such as program modules, being executed by a computer. In one example implementation, such program modules include routines, programs, objects, components and/or data structures that are configured to perform particular tasks or implement particular abstract data types. In addition, one aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

An illustrative diagram of a computer program product embodying the present invention is depicted in FIG. 13. As a non-limiting example, the computer program product is depicted as either a floppy disk 1300 or an optical disk 1302. However, as mentioned previously, the computer program product generally represents computer readable code (i.e., instruction means or instructions) stored on any compatible computer readable medium.

What is claimed is:

1. A system for secure pattern matching, the system comprising:
one or more processors and memory having instructions encoded thereon such that when the instructions are executed, the one or more processors perform operations of:
receiving, as input, a pattern P from a first set of processors, wherein the pattern P comprises a set of characters of an alphabet $\Sigma$;
receiving, as input, a text T from a second set of processors, wherein the text T comprises a set of characters of the alphabet $\Sigma$;
causing the first set of processors to construct a matrix CDV, having a plurality of rows, based on values computed for each character in $\Sigma$ that are determined by each character's position in the pattern P;
causing the first set of processors to send an encrypted matrix E(CDV) and a pattern matching threshold to the second party, wherein E( ) denotes additive homomorphic encryption;
causing the second set of processors to process each character in the text T and retrieve from the encrypted matrix E(CDV) a corresponding row of the encrypted matrix E(CDV), resulting in an encrypted vector;
causing the second set of processors to multiply the encrypted vector with an encrypted activation vector E(AV) having a set of entries;
causing the second set of processors to multiply the pattern matching threshold homomorphically to each of the entries in the activation vector AV to generate a result;
causing the second set of processors to exponentiate the result by a random number to blind each entry in the set of entries of E(AV), resulting in creation of $E(AV_S)$;
causing the second set of processors to send $E(AV_S)$ to the first set of processors;
causing the second set of processors to decrypt $E(AV_S)$; and
providing to the first set of processors where the pattern P matches T, if at all.

2. The system as set forth in claim 1, wherein the second set of processors randomly permutes $E(AV_S)$ to hide possible pattern match locations.

3. The system as set forth in claim 1, wherein a threshold encryption scheme is initialized between the first set of processors and the second set of processors.

4. The system as set forth in claim 1, wherein the first set of processors constructs an encrypted activation vector $E(AV_C)$ for P and T.

5. The system as set forth in claim 4, wherein the one or more processors perform operations of:
verifying if $E(AV_S)$ and $E(AV_C)$, if decrypted, are equal; and
if $E(AV_S)=E(AV_C)$, then providing to the first set of processors where the pattern P matches T.

6. A system for secure pattern matching, the system comprising:
one or more processors and memory having instructions encoded thereon such that when the instructions are executed, the one or more processors perform operations of:
constructing a matrix having a plurality of rows based on values computed for each character in an alphabet $\Sigma$ that are determined by each character's position in an input pattern P;
sending an encrypted matrix E(CDV) and a pattern matching threshold to a set of processors, wherein E( ) denotes additive homomorphic encryption;
receiving, from the set of processors, a blinded encryption activation vector $E(AV_S)$ that is based on processing of each character in an input text T, wherein the text T comprises a set of characters of the alphabet $\Sigma$;
constructing an encrypted activation vector $E(AV_C)$ for P and T;
verifying if $E(AV_S)$ and $E(AV_C)$, if decrypted, are equal; and
if $E(AV_S)=E(AV_C)$, then providing where the pattern P matches T, if at all.

7. A system for secure pattern matching, the system comprising:
one or more processors and memory having instructions encoded thereon such that when the instructions are executed, the one or more processors perform operations of:

receiving an encrypted matrix E(CDV) and a pattern matching threshold, wherein E( ) denotes additive homomorphic encryption, wherein the encrypted matrix E(CDV) is based on values computed for each character in an alphabet Σ that are determined by each character's position in an input pattern P;

processing each character in an input text T comprising a set of characters of the alphabet 1 and retrieving from the encrypted matrix E(CDV) a corresponding row of the encrypted matrix E(CDV), resulting in an encrypted vector;

multiplying the encrypted vector with an encrypted activation vector E(AV) having a set of entries;

multiplying the pattern matching threshold homomorphically to each of the entries in the activation vector AV to generate a result;

exponentiating the result by a random number to blind each entry in the set of entries of E(AV), resulting in creation of $E(AV_S)$;

sending $E(AV_S)$ to a set of processors;

decrypting $E(AV_S)$; and providing where the pattern P matches T, if at all.

8. A computer-implemented method for secure pattern matching, comprising an act of:

causing one or more processors to execute instructions stored on a non-transitory memory such that upon execution, the one or more processors perform operations of:

receiving, as input, a pattern P, wherein the pattern P comprises a set of characters of an alphabet Σ;

receiving, as input, a text T, wherein the text T comprises a set of characters of the alphabet Σ;

constructing a matrix CDV, having a plurality of rows, based on values computed for each character in Σ that are determined by each character's position in the pattern P;

sending an encrypted matrix E(CDV) and a pattern matching threshold, wherein E( ) denotes additive homomorphic encryption;

processing each character in the text T and retrieve from the encrypted matrix E(CDV) a corresponding row of the encrypted matrix E(CDV), resulting in an encrypted vector;

multiplying the encrypted vector with an encrypted activation vector E(AV) having a set of entries;

multiplying the pattern matching threshold homomorphically to each of the entries in the activation vector AV to generate a result;

exponentiating the result by a random number to blind each entry in the set of entries of E(AV), resulting in creation of $E(AV_S)$;

sending $E(AV_S)$ to a first set of processors;

causing a second set of processors to decrypt $E(AV_S)$; and providing to the first set of processors where the pattern P matches T, if at all.

9. The method as set forth in claim 8, further comprising an act of causing the second set of processors to randomly permute $E(AV_S)$ to hide possible pattern match locations.

10. The method as set forth in claim 8, further comprising an act of initializing a threshold encryption scheme between the first set of processors and the second set of processors.

11. The method as set forth in claim 8, further comprising an act of causing the first set of processors to construct an encrypted activation vector $E(AV_C)$ for P and T.

12. The method as set forth in claim 11, further comprising acts of:

verifying if $E(AV_S)$ and $E(AV_C)$, if decrypted, are equal; and if $E(AV_S)=E(AV_C)$, then providing to the first set of processors where the pattern P matches T.

13. A computer program product for secure pattern matching, the computer program product comprising computer-readable instructions stored on a non-transitory computer-readable medium that are executable by a computer having a processor for causing the processor to perform operations of:

receiving, as input, a pattern P, wherein the pattern P comprises a set of characters of an alphabet Σ;

receiving, as input, a text T, wherein the text T comprises a set of characters of the alphabet Σ;

constructing a matrix CDV having a plurality of rows, based on values computed for each character in Σ that are determined by each character's position in the pattern P;

sending an encrypted matrix E(CDV) and a pattern matching threshold, wherein E( ) denotes additive homomorphic encryption;

processing each character in the text T and retrieve from the encrypted matrix E(CDV) a corresponding row of the encrypted matrix E(CDV), resulting in an encrypted vector;

multiplying the encrypted vector with an encrypted activation vector E(AV) having a set of entries;

multiplying the pattern matching threshold homomorphically to each of the entries in the activation vector AV to generate a result;

exponentiating the result by a random number to blind each entry in the set of entries of E(A 3, resulting in creation of $E(AV_S)$;

sending $E(AV_S)$ to a first set of processors;

causing a second set of processors to decrypt $E(AV_S)$; and providing to the first set of processors where the pattern P matches T if at all.

14. The computer program product as set forth in claim 13, further comprising instructions for causing the second set of processors to randomly permute $E(AV_S)$ to hide possible pattern match locations.

15. The computer program product as set forth in claim 13, further comprising instructions for initializing a threshold encryption scheme between the first set of processors and the second set of processors.

16. The computer program product as set forth in claim 13, further comprising instructions for causing the first set of processors to construct an encrypted activation vector $E(AV_C)$ for P and T.

17. The computer program product as set forth in claim 16, further comprising instructions for causing the processor to perform operations of:

verifying if $E(AV_S)$ and $E(AV_C)$, if decrypted, are equal; and if $E(AV_S)==E(AV_C)$, then providing to the first party where the pattern P matches T.

* * * * *